US010947880B2

(12) United States Patent
Hatfield et al.

(10) Patent No.: US 10,947,880 B2
(45) Date of Patent: Mar. 16, 2021

(54) INJECTOR FOR REDUCTANT DELIVERY UNIT HAVING FLUID VOLUME REDUCTION ASSEMBLY

(71) Applicant: Continental Powertrain USA, LLC, Auburn Hills, MI (US)

(72) Inventors: Joshua Lee Hatfield, Newport News, VA (US); Keith Aaron Shaw, Yorktown, VA (US); Stephen C Bugos, Poquoson, VA (US)

(73) Assignee: Continental Powertrain USA, LLC, Auburn Hills, MI (US)

( * ) Notice: Subject to any disclaimer, the term of this patent is extended or adjusted under 35 U.S.C. 154(b) by 0 days.

(21) Appl. No.: 16/261,115

(22) Filed: Jan. 29, 2019

(65) Prior Publication Data

US 2019/0234274 A1 Aug. 1, 2019

Related U.S. Application Data

(60) Provisional application No. 62/625,317, filed on Feb. 1, 2018.

(51) Int. Cl.
*F01N 3/20* (2006.01)

(52) U.S. Cl.
CPC ........ *F01N 3/2066* (2013.01); *F01N 2610/02* (2013.01); *F01N 2610/1453* (2013.01); *F01N 2610/1486* (2013.01)

(58) Field of Classification Search
CPC ............... F01N 3/2066; F01N 2610/02; F01N 2610/1453; F01N 2610/1486; F02M 61/167; F02M 61/165; F02M 61/168
(Continued)

(56) References Cited

U.S. PATENT DOCUMENTS

| 4,957,085 A | * | 9/1990 | Sverdlin | ............... | F02M 47/043 |
| | | | | | 123/41.31 |
| 5,275,341 A | | 1/1994 | Romann et al. | | |

(Continued)

FOREIGN PATENT DOCUMENTS

| DE | 10058015 A1 | 5/2002 |
| DE | 102007026892 A1 | 12/2008 |

(Continued)

OTHER PUBLICATIONS

"Marvac 125—Mechanical Properties Tape," Vacuumschmelze GmbH & Co., http://www.vacuumschmelze.de/de/produkte/halbzeug-teile/physikalisch/federlegierungen/marvac-125/marvac-125-mechanische-eigenschaften-band.html (English language web page is http://www.vacuumschmelze.com/en/products/materials-parts/physical/spring-alloys/marvac-125/marvac-125-mechanische-eigenschaften-band.html); May 15, 2013 (as reported by Vacuumschmlze GmbH and listed on web page; content captured Mar. 14, 2018).

(Continued)

*Primary Examiner* — Joshua A Greenlund

(57) ABSTRACT

A fluid injector includes a calibration filter tube including a bore defined in an axial direction through the calibration filter tube, the bore defining at least a portion of a fluid path through the fluid injector, the calibration filter tube including a plurality of holes which extend from the bore to an outer surface of the calibration filter tube. A volume reduction member has a bore though which the calibration filter tube extends, the volume reduction member occupying a space between the outer surface of the calibration filter tube and an inner surface of the tube member, the volume reduction member being constructed from resilient, compressible material. Freezing or frozen fluid disposed in the calibration filter tube expands through the holes and at least partially compresses the volume reduction member, so as to reduce (Continued)

fluid expansion forces damaging other components of the fluid injector.

10 Claims, 17 Drawing Sheets

(58) Field of Classification Search
USPC .......................................................... 239/548
See application file for complete search history.

(56) References Cited

U.S. PATENT DOCUMENTS

| | | | |
|---|---|---|---|
| 5,383,606 A | 1/1995 | Stegmaier et al. | |
| 5,516,424 A | 5/1996 | Strohschein | |
| 5,634,597 A | 6/1997 | Krohn et al. | |
| 5,775,600 A * | 7/1998 | Wildeson | F02M 51/0671 239/585.1 |
| 5,794,856 A * | 8/1998 | Nally | F02M 69/047 239/408 |
| 5,996,910 A * | 12/1999 | Takeda | F02M 51/0614 239/585.1 |
| 6,076,802 A * | 6/2000 | Maier | F02M 51/0682 251/129.21 |
| 6,173,915 B1 | 1/2001 | Cohen et al. | |
| 6,199,775 B1 | 3/2001 | Dallmeyer | |
| 6,264,112 B1 * | 7/2001 | Landschoot | F02M 51/0667 239/5 |
| 6,325,049 B1 * | 12/2001 | Nally | F02M 61/145 123/470 |
| 6,328,232 B1 * | 12/2001 | Haltiner, Jr. | F02M 51/0614 239/533.2 |
| 6,454,192 B2 * | 9/2002 | Perry | F02M 51/0667 239/585.1 |
| 6,676,044 B2 | 1/2004 | Dallmeyer et al. | |
| 6,685,112 B1 | 2/2004 | Hornby et al. | |
| 6,698,664 B2 | 3/2004 | Dallmeyer et al. | |
| 6,834,667 B2 | 12/2004 | Sumiya et al. | |
| 7,128,281 B2 | 10/2006 | Cho et al. | |
| 7,296,781 B2 * | 11/2007 | Akabane | F02M 51/0657 239/585.1 |
| 7,309,033 B2 | 12/2007 | Dallmeyer | |
| 7,389,952 B2 | 6/2008 | Dallmeyer | |
| 7,422,160 B2 | 9/2008 | Dallmeyer | |
| 7,429,006 B2 | 9/2008 | Dallmeyer | |
| 7,431,226 B2 | 10/2008 | Cho et al. | |
| 7,481,049 B2 | 1/2009 | Huber et al. | |
| 7,506,826 B2 | 3/2009 | Miller | |
| 7,552,880 B2 | 6/2009 | Dallmeyer | |
| 7,617,605 B2 * | 11/2009 | Fochtman | B23K 26/0823 123/470 |
| 7,617,991 B2 | 11/2009 | Wells et al. | |
| 7,673,818 B2 | 3/2010 | Akabane | |
| 7,721,713 B2 | 5/2010 | Hayatani et al. | |
| 7,798,131 B2 * | 9/2010 | Hornby | F02M 61/145 123/491 |
| 7,832,660 B2 | 11/2010 | Imoehl | |
| 7,866,577 B2 | 1/2011 | Yoshimaru et al. | |
| 7,886,718 B2 | 2/2011 | Manubolu et al. | |
| 7,931,217 B2 | 4/2011 | Matsusaka et al. | |
| 7,942,348 B2 | 5/2011 | Reiter | |
| 7,942,381 B2 | 5/2011 | Sugiyama et al. | |
| 8,002,287 B2 | 8/2011 | Wagner | |
| 8,037,868 B2 | 10/2011 | Kannan et al. | |
| 8,087,239 B2 | 1/2012 | Bugos et al. | |
| 8,215,573 B2 | 7/2012 | Hornby | |
| 8,347,605 B2 | 1/2013 | Bugos et al. | |
| 8,646,704 B2 | 2/2014 | Yamamoto et al. | |
| 8,740,113 B2 | 6/2014 | Roessle et al. | |
| 8,857,743 B2 | 10/2014 | Shingu et al. | |
| 8,973,895 B2 | 3/2015 | Thomas et al. | |
| 8,997,463 B2 | 4/2015 | Bugos et al. | |
| 8,998,114 B2 | 4/2015 | Olivier et al. | |
| 9,033,264 B2 | 5/2015 | Stier | |
| 9,200,604 B2 | 12/2015 | Derenthal et al. | |
| 9,273,581 B2 | 3/2016 | Van Vuuren | |
| 9,422,901 B2 | 8/2016 | Suzuki et al. | |
| 9,587,603 B2 | 3/2017 | Hanjagi et al. | |
| 9,605,638 B2 | 3/2017 | Falaschi et al. | |
| 9,683,472 B2 | 6/2017 | Thomas et al. | |
| 9,777,859 B2 | 10/2017 | van Vuuren et al. | |
| 9,822,749 B2 | 11/2017 | Derenthal et al. | |
| 10,502,112 B2 * | 12/2019 | Hatfield | F01N 3/2066 |
| 10,539,057 B2 * | 1/2020 | VanVuuren | F01N 3/208 |
| 10,655,523 B2 * | 5/2020 | Upadhye | F01N 3/2066 |
| 2002/0104904 A1 | 8/2002 | McFarland | |
| 2003/0094513 A1 * | 5/2003 | Luft | F02M 61/168 239/533.9 |
| 2003/0201343 A1 * | 10/2003 | Dallmeyer | F02M 51/0625 239/533.2 |
| 2004/0056113 A1 * | 3/2004 | Peterson, Jr. | F02M 61/1853 239/533.2 |
| 2004/0262333 A1 | 12/2004 | Huber et al. | |
| 2005/0023383 A1 * | 2/2005 | Morton | F02M 61/16 239/585.1 |
| 2005/0133630 A1 * | 6/2005 | Hornby | B29C 66/5344 239/533.2 |
| 2005/0133639 A1 | 6/2005 | Hornby | |
| 2005/0173869 A1 | 8/2005 | Wagner | |
| 2005/0269426 A1 | 12/2005 | Cho | |
| 2006/0254648 A1 | 11/2006 | Maisch et al. | |
| 2007/0033927 A1 | 2/2007 | Hornby et al. | |
| 2007/0057095 A1 * | 3/2007 | Bayer | F16K 31/06 239/585.1 |
| 2007/0095745 A1 * | 5/2007 | Sebastian | F02M 61/168 210/439 |
| 2007/0114299 A1 * | 5/2007 | Scheffel | F02M 61/168 239/88 |
| 2007/0194152 A1 * | 8/2007 | Abe | F02M 51/0653 239/585.2 |
| 2009/0065608 A1 | 3/2009 | Vogel et al. | |
| 2009/0179090 A1 | 7/2009 | Reiter | |
| 2009/0184184 A1 * | 7/2009 | Schwegler | F02M 61/166 239/585.1 |
| 2009/0229575 A1 | 9/2009 | Giorgetti et al. | |
| 2009/0230677 A1 | 9/2009 | Mannucci et al. | |
| 2010/0025500 A1 | 2/2010 | Pollard et al. | |
| 2010/0213286 A1 * | 8/2010 | Grandi | F02M 51/061 239/575 |
| 2010/0264229 A1 * | 10/2010 | Facchin | F02M 51/0685 239/1 |
| 2010/0313553 A1 | 12/2010 | Cavanagh et al. | |
| 2011/0192140 A1 | 8/2011 | Olivier et al. | |
| 2011/0258983 A1 | 10/2011 | Vosz | |
| 2011/0309166 A1 | 12/2011 | Thomas et al. | |
| 2012/0031996 A1 | 2/2012 | Harvey et al. | |
| 2013/0026257 A1 * | 1/2013 | Jalal | F02M 51/0603 239/585.5 |
| 2013/0061578 A1 * | 3/2013 | Van Vuuren | F01N 3/2066 60/295 |
| 2013/0292498 A1 * | 11/2013 | Olivier | F01N 3/208 239/585.1 |
| 2014/0001290 A1 * | 1/2014 | Nishida | F02M 61/10 239/585.1 |
| 2014/0008468 A1 * | 1/2014 | Graner | F02M 51/0625 239/585.1 |
| 2014/0054394 A1 * | 2/2014 | Bugos | F01N 3/10 239/132.3 |
| 2014/0075923 A1 * | 3/2014 | Hodgson | F01N 3/2066 60/282 |
| 2014/0138568 A1 | 5/2014 | van Vuuren et al. | |
| 2015/0059322 A1 * | 3/2015 | Bugos | F01N 3/208 60/298 |
| 2015/0102241 A1 | 4/2015 | Sebastian | |
| 2015/0115051 A1 | 4/2015 | Van Vuuren | |
| 2015/0369176 A1 | 12/2015 | Ittlinger et al. | |
| 2017/0101966 A1 | 4/2017 | Filippi et al. | |
| 2018/0023438 A1 * | 1/2018 | McFarland | F01N 3/206 422/168 |
| 2018/0058291 A1 | 3/2018 | Bugos et al. | |
| 2018/0179938 A1 | 6/2018 | Shaull et al. | |
| 2018/0202404 A1 | 7/2018 | Jovovic et al. | |

(56) References Cited

U.S. PATENT DOCUMENTS

| | | | | |
|---|---|---|---|---|
| 2018/0230955 | A1* | 8/2018 | Bleeck | F02M 59/368 |
| 2018/0238217 | A1* | 8/2018 | Devito | B01D 53/9495 |
| 2019/0078482 | A1* | 3/2019 | Cosby | F01N 3/2066 |
| 2019/0078485 | A1* | 3/2019 | VanVuuren | F01N 3/2066 |
| 2019/0078486 | A1* | 3/2019 | Hatfield | F01N 3/2066 |
| 2019/0078487 | A1* | 3/2019 | Hatfield | F01N 3/2066 |
| 2019/0078488 | A1* | 3/2019 | Hatfield | F01N 3/2896 |
| 2019/0234274 | A1* | 8/2019 | Hatfield | F01N 3/2066 |
| 2019/0293040 | A1* | 9/2019 | Pobuda | F01N 3/2066 |
| 2019/0308206 | A1* | 10/2019 | Ummel | F02M 51/0682 |

FOREIGN PATENT DOCUMENTS

| | | |
|---|---|---|
| DE | 102008041544 A1 | 3/2010 |
| DE | 102008042987 A1 | 4/2010 |
| DE | 102009000107 A1 | 7/2010 |
| DE | 102010029254 A1 | 12/2011 |
| DE | 102010039052 A1 | 2/2012 |
| DE | 102010045509 A1 | 3/2012 |
| DE | 102011018181 A1 | 2/2014 |
| DE | 102012021664 A1 | 5/2014 |
| DE | 102015217673 A1 | 3/2017 |
| EP | 1965049 A2 | 9/2008 |
| JP | 2002327660 A | 11/2002 |
| JP | 4200003 B2 | 5/2004 |
| JP | 2004316520 A | 11/2004 |
| JP | 2009504985 A | 2/2009 |
| JP | 2010216483 A | 9/2010 |
| KR | 307891 A | 2/1994 |
| KR | 20130140871 A | 12/2013 |
| KR | 102014092848 A | 7/2014 |
| WO | 20170045845 A | 3/2017 |

OTHER PUBLICATIONS

"Marvac 125—Physical Properties," Vacuumschmelze GmbH & Co., http://www.vacuumschmelze.de/de/produkte/halbzeug-teile/physikalisch/federlegierungen/marvac-125/marvac-125-physikalische-eigenschaften.html (English language web page is http://www.vacuumschmelze.com/en/products/materials-parts/physical/spring-alloys/marvac-125/marvac-125-physical-properties.html); May 15, 2013 (as reported by Vacuumschmlze GmbH and listed on web page; content captured Mar. 14, 2018).

"Marvac 125—Chemical Composition," Vacuumschmelze GmbH & Co., http://www.vacuumschmelze.de/de/produkte/halbzeug-teile/physikalisch/federlegierungen/marvac-125/marvac-125-chemische-zusammensetzung.html (English language web page is http://www.vacuumschmelze.com/en/products/materials-parts/physical/spring-alloys/marvac-125/marvac-125-chemical-composition.html); May 15, 2013 (as reported by Vacuumschmlze GmbH and listed on web page; content captured on Mar. 14, 2018).

European Search Report dated Mar. 26, 2019 for counterpart EP patent application 19154813.0.

File History of U.S. Appl. No. 15/704,402, including non-final Office Action dated Nov. 25, 2019.

File History of U.S. Appl. No. 15/704,268, now U.S. Pat. No. 10,539,057, including non-final Office Action dated May 1, 2019.

File History of U.S. Appl. No. 15/704,294, now U.S. Pat. No. 10,502,112, including non-final Office Action dated Apr. 4, 2019.

File History of U.S. Appl. No. 15/922,548, including non-final Office Action dated Dec. 12, 2019.

Final Office Action for U.S. Appl. No. 15/922,548, dated Jun. 15, 2020.

Final Office Action for U.S. Appl. No. 15/704,402, dated Jun. 2, 2020.

* cited by examiner

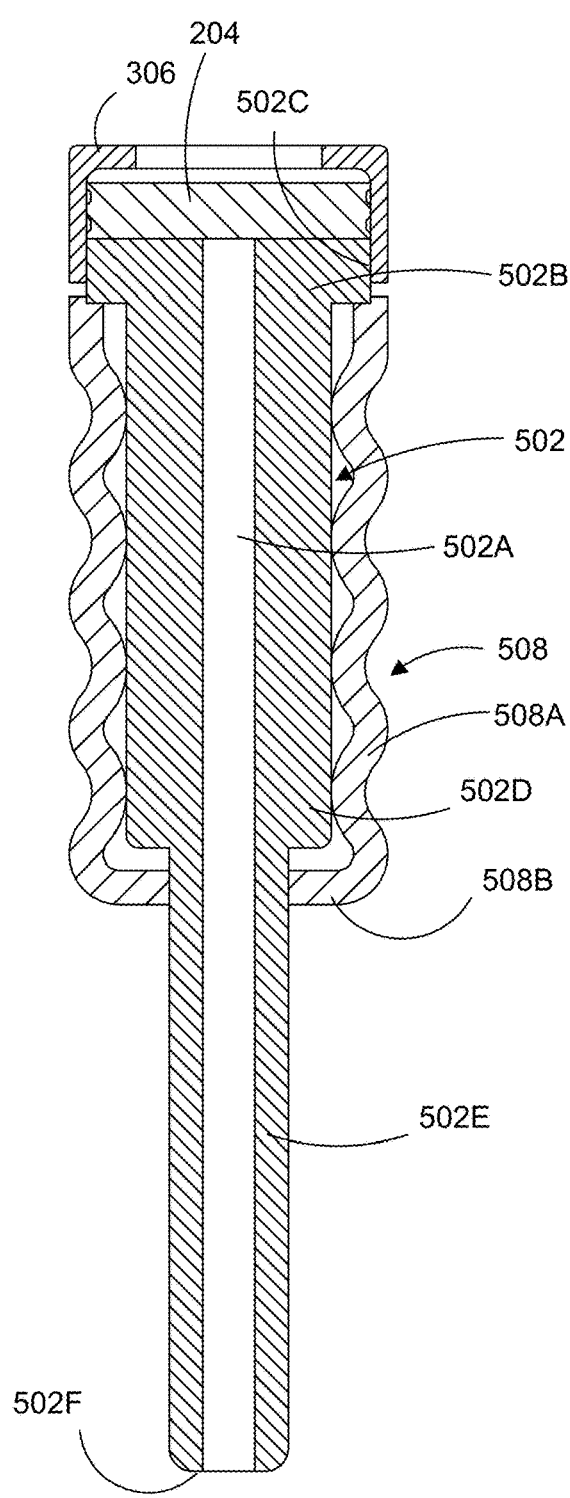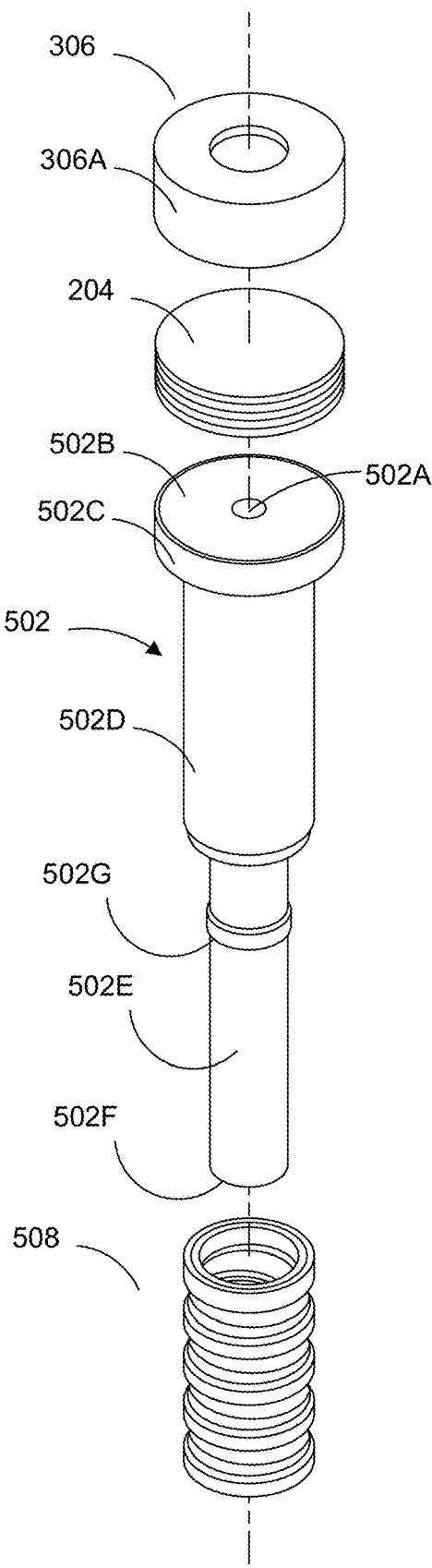
FIG. 16
FIG. 17

INJECTOR FOR REDUCTANT DELIVERY UNIT HAVING FLUID VOLUME REDUCTION ASSEMBLY

CROSS-REFERENCE TO RELATED APPLICATIONS

The present application claims the benefit of U.S. provisional application 62/625,317, filed Feb. 1, 2018, and entitled "INJECTOR FOR REDUCTANT DELIVERY UNIT HAVING FLUID VOLUME REDUCTION ASSEMBLY," the content of which is hereby incorporated by reference herein in its entirety.

FIELD OF INVENTION

The present invention generally relates to a fluid injector of a reductant delivery unit (RDU), and particularly to a robust RDU fluid injector for non-purge applications.

BACKGROUND

Emissions regulations in Europe and North America are driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx) that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a diesel exhaust fluid (DEF) and/or liquid aqueous urea solution, typically at a 32% concentration of urea ($CO(NH_2)_2$). The solution is referred to as AUS-32, and is also known under its commercial name of AdBlue. The reductant solution is delivered to the hot exhaust stream typically through the use of an injector, and is transformed into ammonia prior to entry in the catalyst. More specifically, the solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

AUS-32, or AdBlue, has a freezing point of –11 C, and system freezing is expected to occur in cold climates. Since these fluids are aqueous, volume expansion happens after the transition to the solid state upon freezing. The expanding solid can exert significant forces on any enclosed volumes, such as an injector. This expansion may cause damage to the injection unit, so different SCR strategies exist for addressing reductant expansion.

There are two known SCR system strategies in the marketplace: purge systems and non-purge systems. In purge SCR systems, the reductant urea and/or DEF solution is purged from the RDU when the vehicle engine is turned off. In non-purge SCR systems, the reductant remains in the RDUs throughout the life of the vehicle. During normal operation of a non-purge SCR system, the RDU injector operates at temperatures which are above the freezing point of the reductant such that reductant in the RDU remains in the liquid state. When the vehicle engine is turned off in the non-purge SCR system, however, the RDU injector remains filled with reductant, thereby making the RDU injector susceptible to damage from reductant expanding in freezing conditions.

SUMMARY

Example embodiments overcome shortcomings found in existing RDU fluid injectors and provide an improved fluid injector for non-purge SCR systems in which the adverse effects from the RDU being in temperatures that are below the freezing point of reductant are reduced.

In an example embodiment, an RDU includes a fluid injector having a fluid inlet disposed at a first end of the fluid injector for receiving a reductant, and a fluid outlet disposed at a second end of the fluid injector for discharging the reductant, the fluid injector defining a fluid path for the reductant from the fluid inlet to the fluid outlet. The fluid injector includes a tube member having an end disposed at or near the fluid inlet of the fluid injector, the tube member configured to pass reductant along the fluid path; a calibration filter tube disposed in the tube, the calibration filter tube having a first end portion adjacent the filter and a second end, and further including a bore defined in an axial direction through the calibration filter tube, the bore defining at least a portion of the fluid path through the fluid injector; an actuator unit disposed within the fluid injector downstream of the calibration filter tube, the actuator unit engaging the second end of the calibration filter tube; a valve assembly operatively coupled to the actuator unit, wherein a position of the calibration filter tube within the tube member at least partly sets an opposing opening force for the valve assembly; and a volume reduction member having a bore though which the calibration filter tube extends, the volume reduction member occupying a space between an outer surface of the calibration filter tube and an inner surface of the tube member. The calibration filter tube includes one or more apertures extending between the bore of the calibration filter tube and the outer surface thereof.

The volume reduction member is formed from a resilient, compressible material. The resilient, compressible material includes one of a rubber composition and closed cell foam.

The fluid injector further includes a filter and a cap member including a sidewall defining an inner space into which the filter is disposed, the sidewall contacting the first end of the calibration filter tube.

The one or more holes of the calibration filter tube is adjacent the volume reduction member such that freezing or frozen reductant disposed in the calibration filter tube expands through the holes and at least partially compresses the volume reduction member. Melting reductant allows for the volume reduction member to expand so as to be adjacent the holes of the calibration filter tube.

BRIEF DESCRIPTION OF THE DRAWINGS

Aspects of the invention will be explained in detail below with reference to an exemplary embodiment in conjunction with the drawings, in which:

FIG. 16 is a cross-sectional view of integrated components of the fluid injector of FIG. 15;

FIG. 17 is an exploded perspective view of the components of the fluid injector of FIG. 15;

DETAILED DESCRIPTION

The following description of the example embodiment(s) is merely exemplary in nature and is in no way intended to limit the invention, its application, or uses.

Example embodiments are generally directed to an RDU for a non-purge SCR system in which damaging effects from a reductant, DEF and/or urea solution freezing in the RDU injector are reduced.

Figure 1:
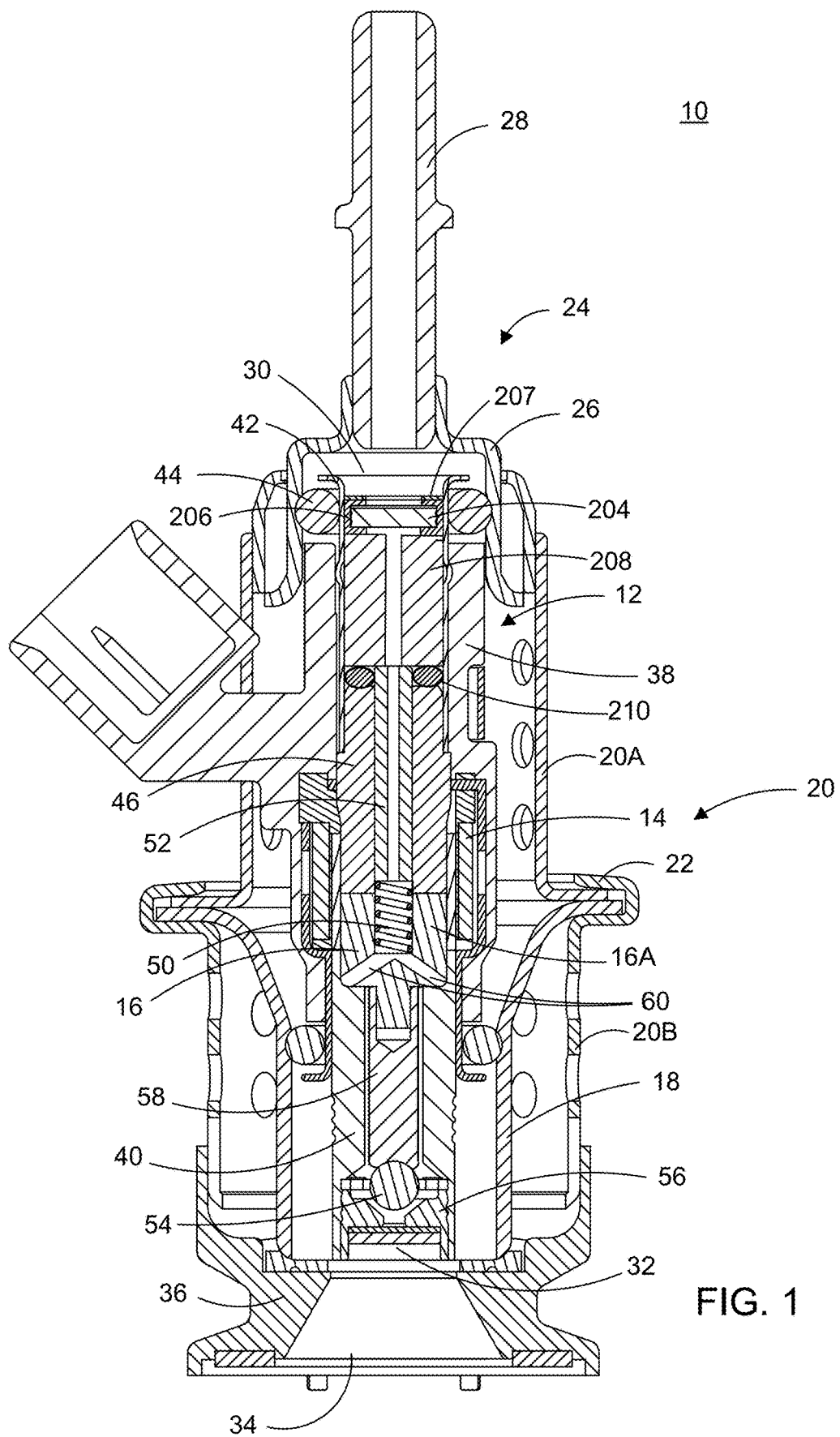
FIG. 1 is a cross-sectional side view of an RDU for a non-purge SCR system according to an example embodiment.
Figure 2:
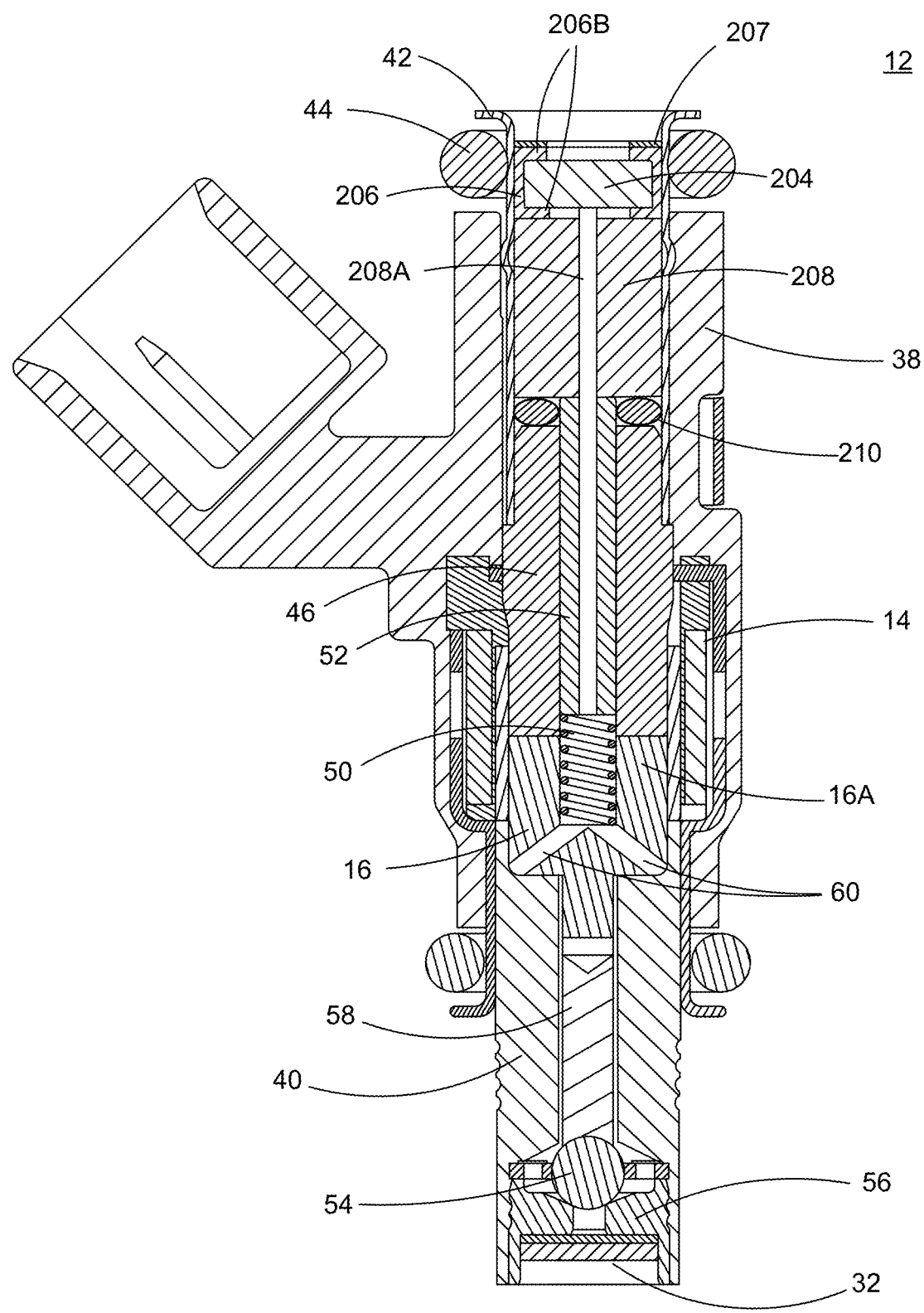
FIG. 2 is a cross-sectional side view of a fluid injector of the RDU of FIG. 1.

FIG. 1 illustrates an RDU 10 of a non-purge SCR system according to an example embodiment. RDU 10 includes a solenoid fluid injector, generally indicated at 12, that provides a metering function of fluid and provides the spray preparation of the fluid into the exhaust path of a vehicle in a dosing application. Thus, fluid injector 12 is constructed and arranged to be associated with an exhaust gas flow path upstream of a selective catalytic reduction (SCR) catalytic converter (not shown). Fluid injector 12 may be an electrically operated, solenoid fuel injector. As shown in FIGS. 1 and 2, fluid injector 12 includes an actuator unit having a coil 14 and a movable armature 16. Components of injector 12 define a fluid path for a reductant, DEF and/or urea solution through injector 12. The reductant, DEF and/or urea solution which RDU 10 is configured to inject into the exhaust path of a vehicle engine will be hereinafter referred to as "reductant" for simplicity.

Fluid injector 12 is disposed in an interior carrier 18 of RDU 10, as shown in FIG. 1. An injector shield, generally indicated at 20, is formed by upper shield 20A and lower shield 20B, which surround injector 12 and are coupled to carrier 18 by folding tangs of a flange 22 of lower shield 20B over shelf features of carrier 18 and upper shield 20A. As a result, shield 20 and carrier 18 are fixed with respect to injector 12.

An inlet cup structure of RDU 10, generally indicated at 24 in FIG. 1, includes a cup 26 and a fluid supply tube 28 integrally formed with cup 26. Fluid supply tube 28 is in communication with a source of a reductant (not shown) that is fed into a fluid inlet 30 of injector 12 for ejection from a fluid outlet 32 thereof and into the exhaust stream of a vehicle engine (not shown). Fluid inlet 30 of injector 12 is in fluid communication with fluid supply tube 28. Fluid outlet 32 is fluidly connected with a flange outlet 34 of an exhaust flange 36 that is coupled directly with an end of lower shield 20B of RDU 10.

Injector 12 includes an injector body structure in which the components of injector 12 are disposed. The injector body structure includes a first injector body portion 38 in which coil 14 and armature 16 are disposed, and a valve body portion 40 in which a valve assembly of injector 12 is at least partly disposed. First injector body portion 38 and valve body portion 40 are fixedly connected, either directly or indirectly, to each other.

Figure 3:
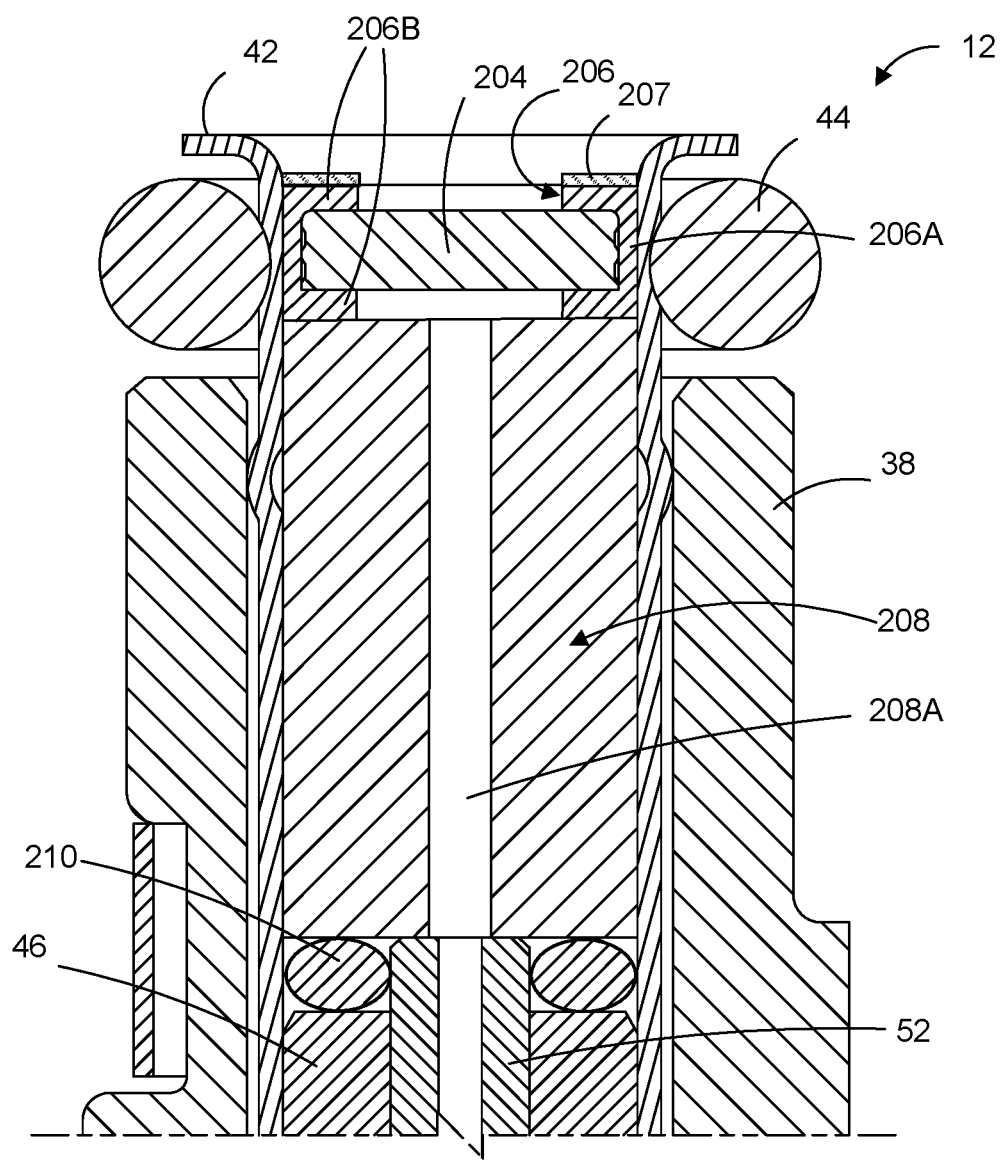
FIG. 3 is a magnified cross-sectional view of the inlet portion of the fluid injector of the RDU of FIG. 1 according to an example embodiment.

Referring to FIGS. 1-3, fluid injector 12 includes a tube member 42 which is at least partly disposed within first injector body portion 38. The outer surface of tube member 42 contacts the inner surface of first injector body portion 38. An open end of tube member 42 is disposed within cup 26 and is in fluid communication with fluid supply tube 28. An O-ring 44 is disposed within cup 26, between an inner surface thereof and the outer surface of tube member 42, proximal to the open end of tube member 42. O-ring 44 serves to ensure that reductant exiting fluid supply tube 28 passes into the open end of tube member 42 of injector 12.

The actuator unit of fluid injector 12 further includes a pole piece 46 which is fixedly disposed within first injector body portion 38. Coil 14 at least partly surrounds pole piece 46 and armature 16. Pole piece 46 is disposed upstream of armature 16 within injector 12. Pole piece 46 includes a central bore defined axially therethrough.

Armature 16 includes a U-shaped section which defines a pocket in which at least part of a spring 50 is disposed. Spring 50, which is part of the actuator unit, biases movable armature 16 so that armature 16 is spaced apart from pole piece 46 when no current is passed through coil 14. Spring 50 partly extends within the central bore of pole piece 46. An end of spring 50 which extends within pole piece 46 contacts a spring adjustment tube 52. Spring adjustment tube 52 is at least partly disposed within the central bore of pole piece 46, upstream (relative to a direction of flow of reductant through injector 12) of spring 50. Spring adjustment tube 52 includes a bore defined axially therethrough. The throughbore of spring adjustment tube 52 partly defines the fluid path for reductant in fluid injector 12, and defines the only fluid path for reductant through pole piece 46. Due to its engagement with spring 50, spring adjustment tube 52 is used to calibrate the dynamic flow of reductant through fluid injector 12.

Armature 16 further includes one or more channels 60 (FIGS. 1 and 2) defined through the armature 16 from an interior of the pocket to an upstream end portion of pin member 58. Channels 60 may be equally spaced about armature 16. In an example embodiment, armature 16 includes a single channel which is defined entirely around the base of the pocket formed by pocket wall 16A. Channel(s) 60 allows reductant to flow from the pocket of armature 16 to the space around the upstream end of pin member 58. The pocket of armature 16 and the channel(s) 60 together partly define the reductant fluid path of the fluid injector 12 and define the only part of the fluid path passing through or around armature 16.

Figure 5:
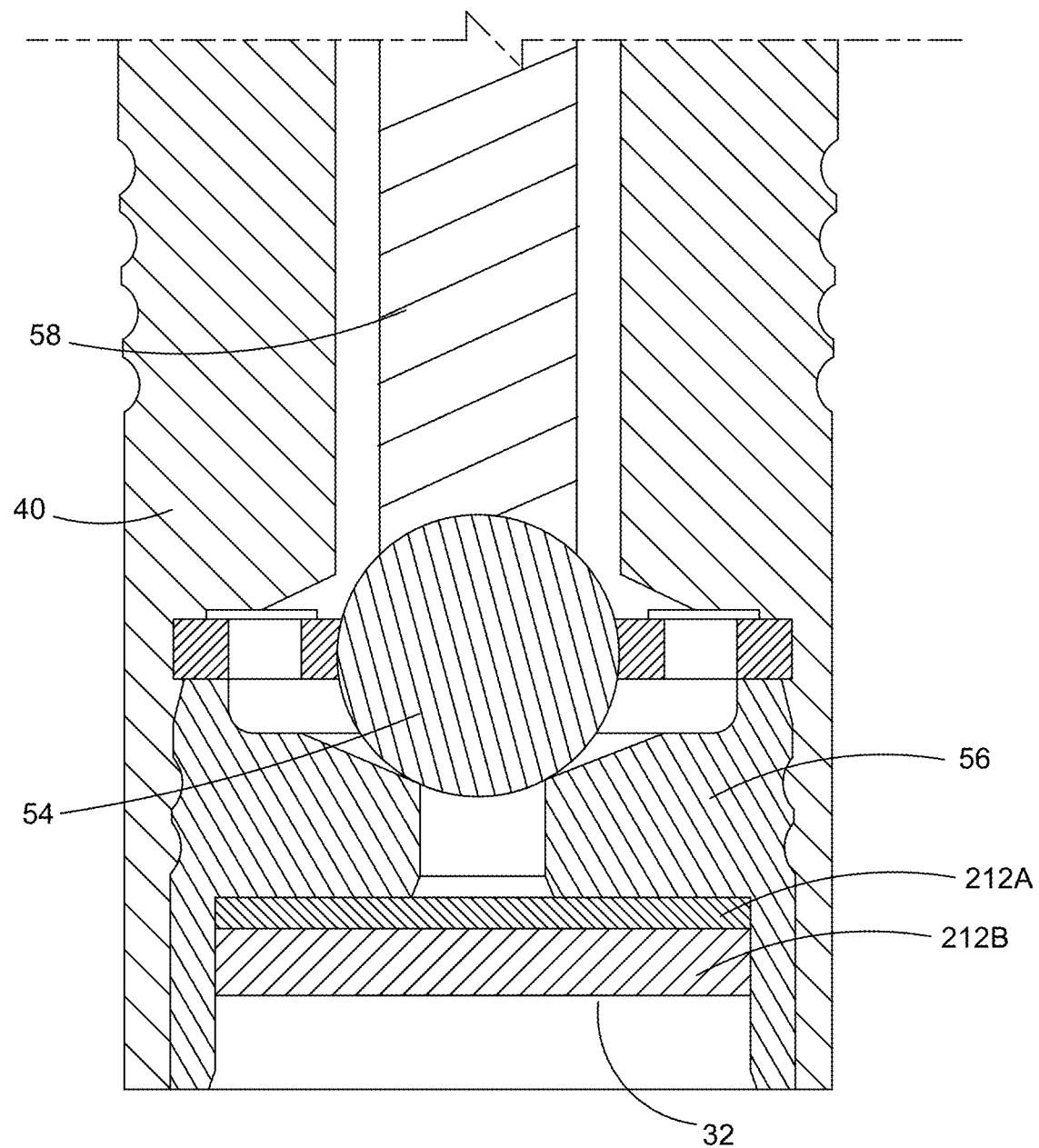
FIG. 5 is a magnified cross-sectional view of the outlet portion of the fluid injector of the RDU of FIG. 1 according to an example embodiment.

Referring to FIGS. 1, 2 and 5, the valve assembly of injector 12 includes a seal member 54 and a seat 56. Seal member 54 is connected to armature 16 via a pin member 58, which is disposed between seal member 54 and the downstream end of armature 16. Seal member 54, pin member 58 and armature 16 may combine to form an armature assembly. When coil 14 is energized, coil 14 generates an electromagnetic force acting on armature 16 which overcomes the bias force from spring 50 and causes armature 16 to move towards pole piece 46, which correspondingly moves pin member 58 so that seal member 54 is lifted off of, and disengages from, seat 56, moving the armature assembly to an open position and thus permitting reductant to pass through fluid outlet 32 to flange outlet 34 and into the exhaust path of the vehicle engine. When coil 14 is de-energized, the electromagnetic force dissipates and spring 50 biases armature 16 so that armature 16 is moved away from pole piece 46, resulting in seal member 54 sealingly engaging with seat 56, changing the armature assembly back to a closed position. With the armature assembly in the closed position, reductant is prevented from flowing through seat 56 and flange outlet 34 and into the exhaust path of the vehicle engine.

As mentioned above, RDU 10 forms part of a non-purge SCR exhaust aftertreatment system. As a result, reductant remains in fluid injector 12 following the vehicle engine being turned off. In example embodiments, fluid injector 12 is configured so that the amount of reductant in fluid injector 12 is reduced. In other words, the total volume of the fluid path for reductant through fluid injector 12 is reduced. By having less space for reductant in injector 12, the amount of reductant in RDU 10 that may potentially freeze is reduced, thereby reducing the susceptibility of injector 12 being damaged by expansion forces from frozen reductant.

In order to reduce the volume of the reductant fluid path in fluid injector 12, the thickness of valve body portion 40 is increased. In addition, pin member 58 is constructed as a solid element such that reductant flows around the outer surface of pin member 58, instead of therethrough. The spacing between the outer surface of pin 58 and the inner surface of valve body portion 40, which partly defines the fluid path for reductant through injector 12, is narrowed. This narrowed portion of the fluid path is the only fluid path for reductant between armature 16 and seat 56 in fluid injector 12. The narrowed fluid path between pin 58 and valve body portion 40 provides a sufficient reductant flow rate through fluid injector 12 for performing reductant injection during normal operation of RDU 10 while at the same time maintaining a relatively small volume of reductant within injector 12 so as to lessen the risk of injector 12 being damage from the reductant therein freezing.

Further, the diameter of the pocket of armature 16, in which spring 50 is at least partly disposed, is reduced, which allows for the thickness of pocket wall 16A of armature 16 to be increased. In an example embodiment, the thickness of pocket wall 16A is between 45% and 75% of the diameter of pocket, such as about 60%. The increase in thickness of pocket wall 16A, as well as the increased thickness of valve body portion 40 and pin member 50 being a solid pin, result in the components of injector 12 being strengthened and thus more resistant to reductant freezing forces.

Still further, the bore of spring adjustment tube 52 is sized for reducing the volume of the reductant fluid path in injector 12. In an example embodiment, the diameter of the bore of spring adjustment tube 52 is between 12% and 22% of the outer diameter of pole piece 46, and particularly between 16% and 19% thereof.

FIG. 3 illustrates an upstream portion of injector 12. Tube member 42 extends at least partly though injector 12. The reductant fluid path through injector 12 passes through tube member 42. Injector 12 includes a filter 204 disposed within tube member 42 proximal to the open end thereof. Filter 204 is a structurally rigid, sintered metal filter, such as a stainless steel material, in order to better withstand expansion forces from reductant freezing. Filter 204 may have a supporting outer structure for added strength. Best seen in FIG. 3, filter 204 is disposed within a cap member 206. Cap member 206 is largely cylindrically shaped having a sidewall 206A extending circumferentially and defining an inner volume sized for receiving filter 204 therein. Cap member 206 is dimensioned to fit within tube member 42, and particularly so that the outer surface of sidewall 206A of cap member 206 contacts the inner surface of tube member 42. Cap member 206 further includes annular members 206B disposed along the axial ends of cap member 206 and extend radially inwardly from sidewall 206A. Annular members 206B serve to maintain filter 204 within cap member 206 in a fixed position. Cap member 206 is constructed of metal or like compositions.

Injector 12 further includes a retaining ring 207 which is disposed in tube member 42 upstream of, and in contact with, cap member 206, as shown in FIGS. 1-3. Retainer ring 207 is fixed to tube member 42 along an inner surface thereof. Retainer ring 207 being fixed in position along tube member 42 serves to maintain downstream components of injector 12 in fixed positions within first injector body portion 38. In an example embodiment, retainer ring 207 is welded along the inner surface of tube member 42. Such weld connection is formed along an entire circumference of the upper edge of retainer ring 207. It is understood, however, that other connection mechanisms may be utilized for fixing retainer ring 207 to tube member 42.

Figure 4:
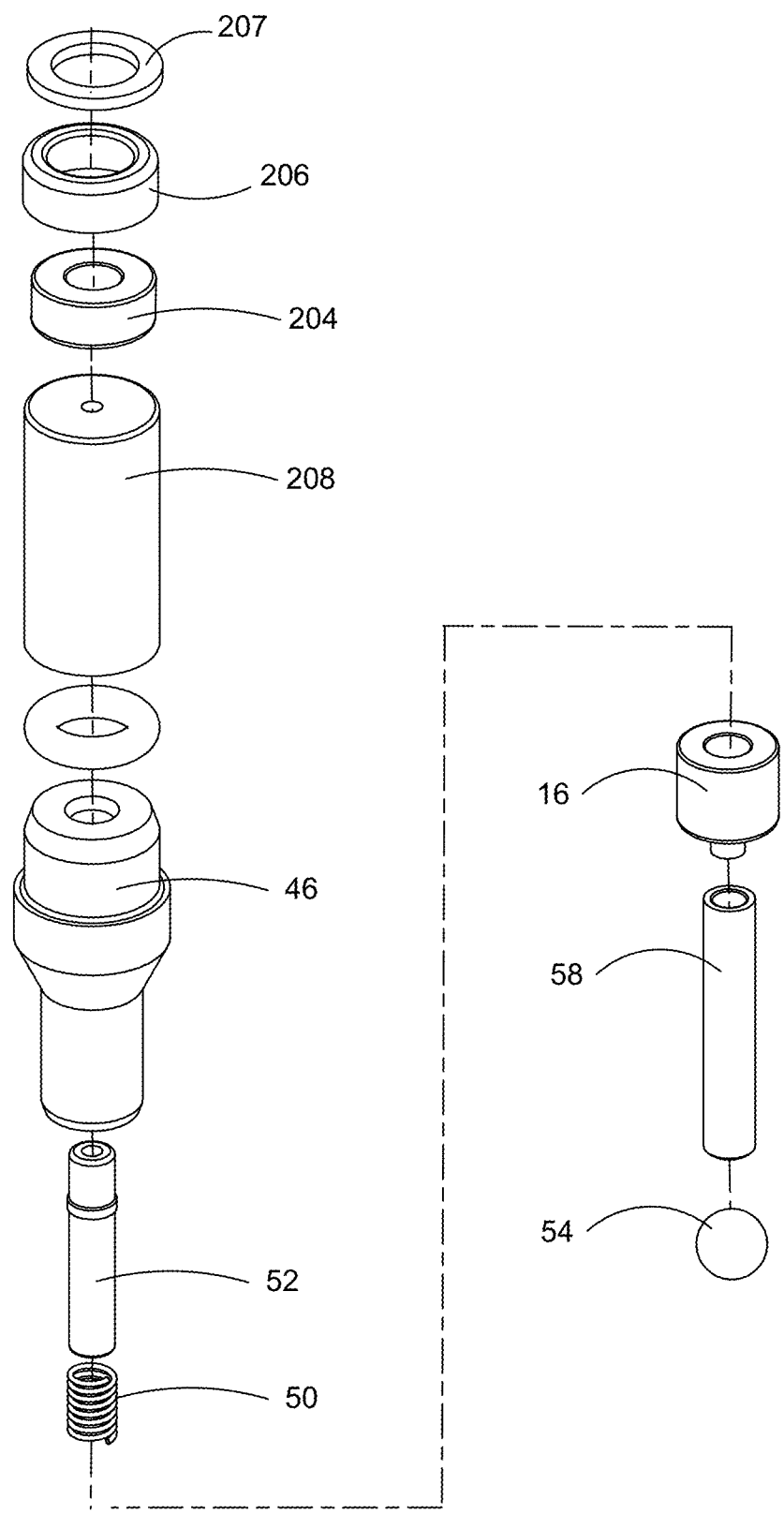
FIG. 4 is an exploded perspective view of components of the fluid injector of the RDU of FIG. 1 according to an example embodiment.

Referring to FIGS. 1-4, injector 12 further includes a volume reduction member 208 which serves to further reduce the volume of the reductant fluid path within injector 12. Reduction member 208 is largely cylindrical in shape, as shown in FIG. 4, having a top (upstream) end and a bottom (downstream) end. In an embodiment, volume reduction member 208 is constructed from a metal, such as stainless steel. It is understood, though, that volume reduction member 208 may be formed from other metals or metal compositions. The outer surface of volume reduction member 208 is sized to contact the inner surface of tube member 42.

Volume reduction member 208 further includes a bore 208A (FIGS. 2 and 3) defined in the axial direction through volume rejection member 208, from one axial (top) end to the other axial (bottom) end. Bore 208A is located along the longitudinal axis of volume reduction member 208 and itself forms part of the fluid path for passing reductant through injector 12. Bore 208A forms the only fluid path for passing reductant through or around volume reduction member 208. In an example embodiment, the diameter of bore 208A is between 12% and 20% of the outer diameter of volume reduction member 208, such as about 16%. Because volume reduction member 208 extends radially to the inner surface of tube member 42, and because the diameter of bore 208A is small relative to the outer diameter of volume reduction member 208, volume reduction member 208 reduces the space or volume in which reductant may reside within injector 12, thereby reducing the volume of the fluid path of reductant therein. Volume reduction member 208 further assists in retaining spring adjustment tube 52 in position within injector 12 such that pin adjustment tube 52 maintains a desired force on spring 50 so as to prevent a loss of calibration. Specifically, retainer ring 207 maintains the position of filter 204 and corresponding cap member 206, which maintain the position of volume reduction member 208, which maintains the position of spring adjustment member 52.

With reference to FIGS. 1-4, fluid injector 12 further includes a volume compensation member 210 which is disposed between the bottom (downstream) end of volume reduction member 208 and the top of pole piece 46. Volume compensation member 210 is constructed from elastic material and serves to occupy the space between volume reduction member 208 and pole piece 46 so as to further lessen the volume of the reductant fluid path in injector 12. Volume compensation member 210 may be in a compressed state in injector 12 when assembled, and contact the volume reduction member 208, pole piece 46, the inner surface of tube member 42 and the outer surface of spring adjustment member 52.

FIG. 5 illustrates a downstream end portion of fluid injector 12. As can be seen, seat 56 includes a bore defined axially through seat 56. In an example embodiment, the length of the throughbore of seat 56 is reduced so as to further reduce the volume of the reductant fluid path through seat 56, and particularly the sac volume below the sealing band of seat 56 which engages with seal member 54.

According to an example embodiment, fluid injector 12 includes a plurality of orifice discs 212 disposed in a stacked arrangement. The orifice disc stack is disposed against the downstream end of seat 56. In the example embodiment illustrated in FIG. 5, the disc stack includes a first disc 212A having one or more orifices that are configured for providing the desired spray pattern of reductant exiting injector 12. It is understood that the dimension and locations of the orifices of first disc 212A may vary and be dependent upon the reductant dosing requirements of the particular vehicle engine. The disc stack further includes a second disc 212B which is disposed downstream of first disc 212A and includes orifices through which the reductant spray passes. Second disc 212B has a larger thickness than the thickness of first disc 212A and being disposed against first disc 212A, and supports first disc 212A so as to prevent the thinner first disc 212A from deforming due to expansion forces from frozen reductant upstream of first disc 212A.

As discussed above, fluid injector 12, and particularly the components thereof, are configured to reduce the volume of the reductant fluid path in injector 12. In example embodiments, the ratio of the volume of the fluid path in fluid injector 12 to a volume of the components of injector 12 (including but not necessarily limited to coil 14, armature 16, pole piece 46, spring adjustment tube 52, volume reduction member 208, volume compensation member 210, filter 204, retaining ring 207, spring 50, pin member 58, seal member 54, seat 56, first injector body portion 20A and valve body portion 40) is between 0.08 and 0.30, and particularly between 0.12 and 0.20, such as about 0.15. These volume amounts are calculated between orthogonal planes relative to the longitudinal axis of fluid injector 12—from a first plane along the open end of tube member 42 (i.e., fluid inlet 30) and a second plane along the lowermost (downstream) surface of second disc 212B (i.e., fluid outlet 32). It is understood that the particular ratio of volume of the reductant path to injector component volume within fluid injector 12 may vary depending upon a number of cost and performance related factors, and may be any value between about 0.08 and about 0.30. Providing a fluid injector having a reduced ratio of reductant fluid path volume to injector component volume to fall within the above range advantageously results in less reductant in injector 12 which reduces the susceptibility of RDU 10 being damaged if the reductant in injector 12 freezes.

Figure 6:
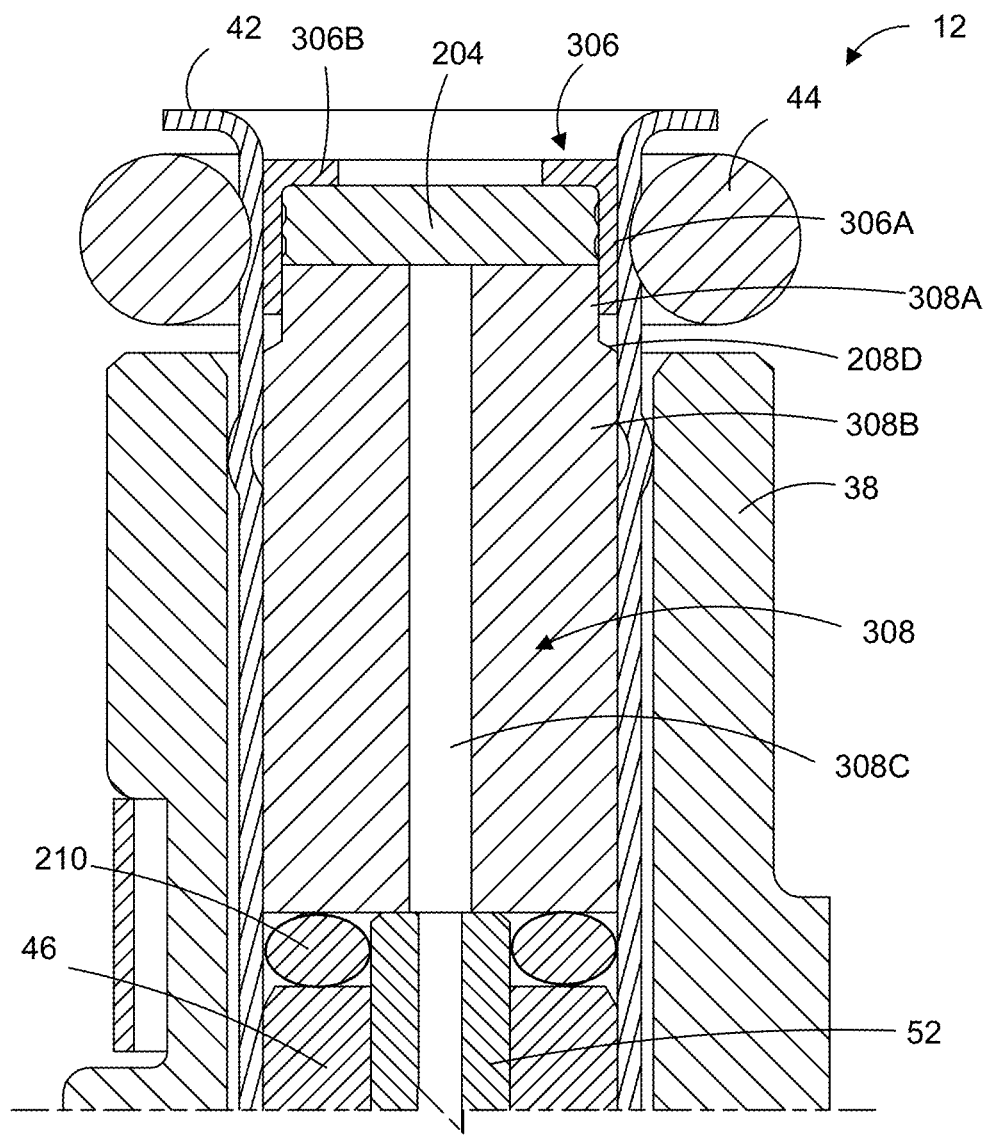
FIG. 6 is a magnified cross-sectional view of the inlet portion of the fluid injector of the RDU of FIG. 1 according to another example embodiment.
Figure 7:
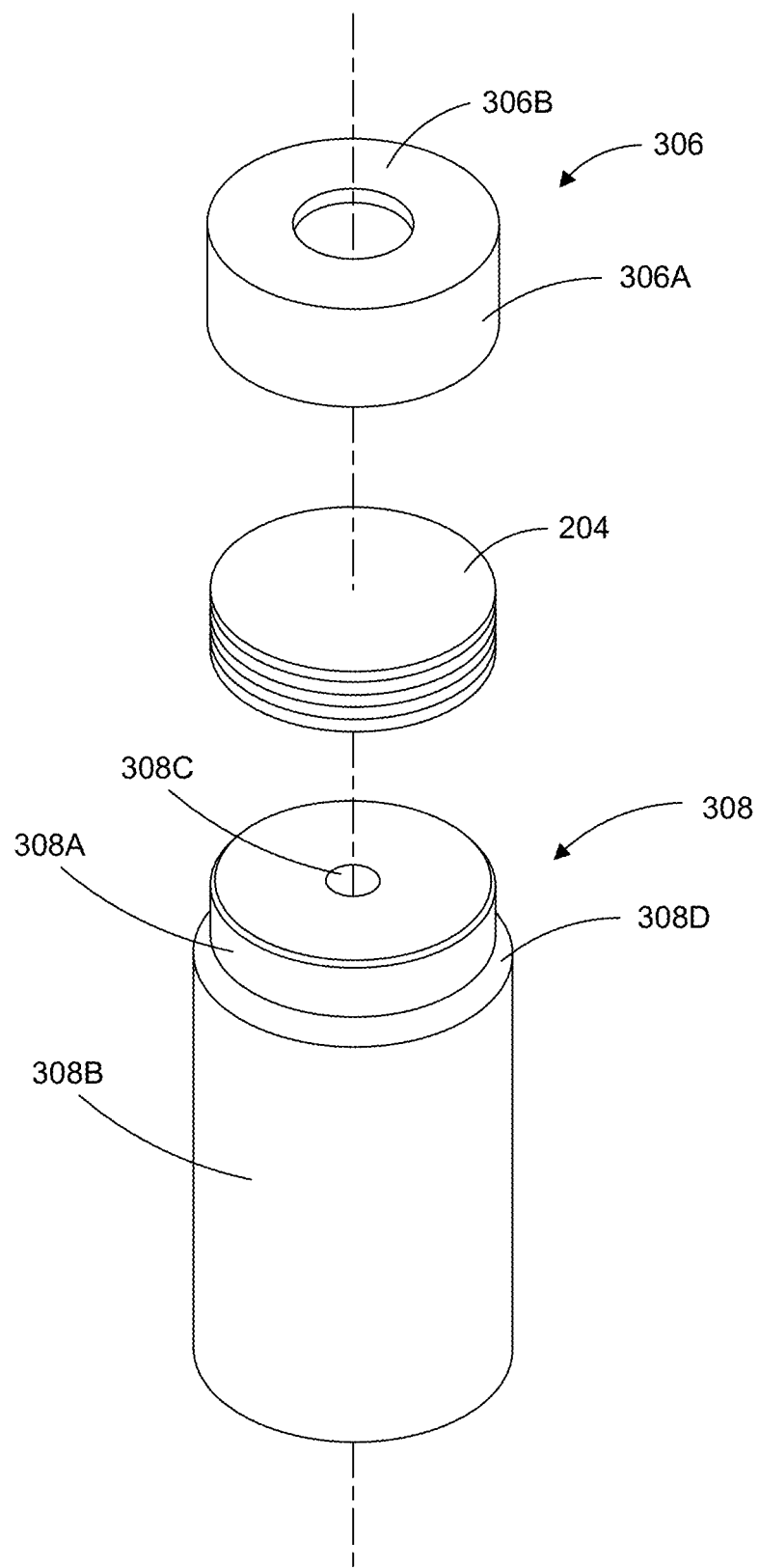
FIG. 7 is an exploded perspective view of components of the fluid injector of FIG. 6.
Figure 8:
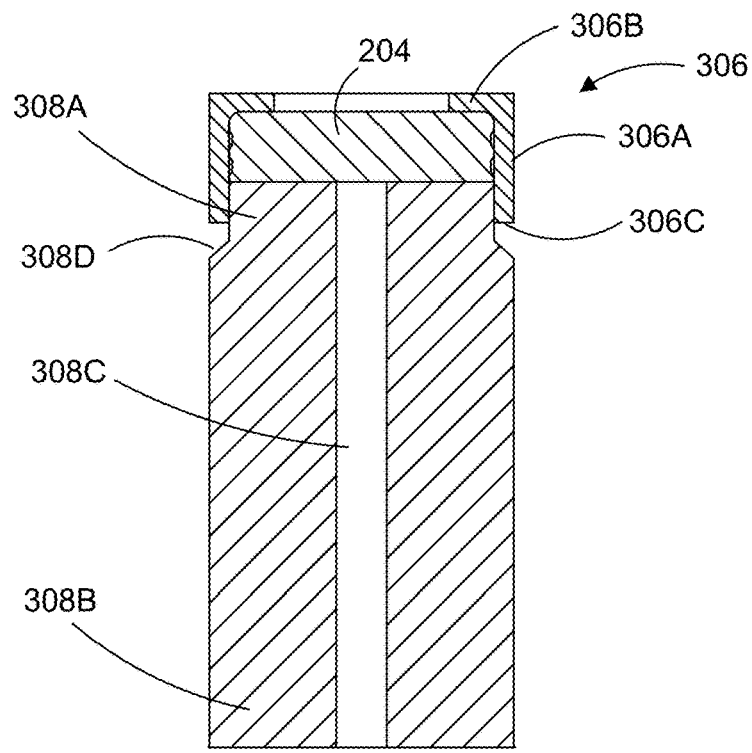
FIG. 8 is a cross-sectional view of the components of FIG. 6.

In another example embodiment, shown in FIGS. 6-8, fluid injector 12 includes a volume reduction member 308 which has many of the characteristics of volume reduction member 208 discussed above with respect to FIGS. 1-5. Similar to volume reduction member 208, volume reduction member 308 is constructed from stainless steel or like composition, is disposed in tube member 42 of fluid injector 12 between volume compensation member 210 and filter 204. However, volume reduction member 308 includes a first portion 308A and a second portion 308B. As shown in FIG. 7, each of first portion 308A and second portion 308B has a cylindrical shape, with the outer diameter of first portion 308A being less than the outer diameter of second portion 308B. The outer diameter of first portion 308A is less than the diameter of second portion 308B by the thickness of sidewall 306A of cap member 306, as will be explained in greater detail below. Volume reduction member 308 includes top (upstream) and bottom (downstream) end portions which form the axial ends of first portion 308A and second portion 308B, respectively. The outer surface of second portion 308B is sized to contact the inner surface of tube member 42.

As mentioned, the outer diameter of first portion 308A of volume reduction member 308 is less than the outer diameter of second portion 308B thereof. As shown in FIGS. 6-8, volume reduction member 308 includes an angled annular surface or skirt 308D, which extends in the axial direction between the outer surface of first portion 308A and the outer surface of second portion 308B and serves as the physical interface therebetween. The angle of angled surface 308D, relative to the longitudinal axis of volume reduction member 308 and/or injector 12, is an acute angle. Alternatively, the angle of angled surface 308D is orthogonal to the longitudinal axis of volume reduction member 308 and/or injector 12.

Volume reduction member 308 further includes a bore 308C defined in the axial direction through volume rejection member 308, from one axial (top) end to the other axial (bottom) end. Bore 308C is located along the longitudinal axis of volume reduction member 308 and itself forms part of the reductant fluid path for passing reductant through injector 12, and the only reductant fluid path through or around volume reduction member 308. In an example embodiment, the diameter of the bore 308C is between 12% and 20% of the outer diameter of volume reduction member 308, such as about 16%. Because volume reduction member 308 extends to the inner surface of tube member 42 and because the diameter of bore 308C is relatively small relative to the outer diameter of volume reduction member 308, volume reduction member 308 occupies a volume within injector 12 which reduces the space or volume of the reductant fluid path through injector 12, thereby reducing the amount of reductant in injector 12 that could freeze and potentially damage injector 12.

Cap member 306 includes a number of the same characteristics of cap member 206 described above with respect to FIGS. 1-5. As shown in FIG. 7, cap member 306 is largely cylindrically shaped having a sidewall 306A extending circumferentially and defining an inner volume sized for receiving filter 204 therein. Cap member 306 is dimensioned to fit within tube member 42, and particularly so that the outer surface of sidewall 306A of cap member 306 contacts the inner surface of tube member 42. Cap member 306 further includes an annular member 306B disposed along the axial (upstream) end of cap member 306 and extending radially inwardly from sidewall 306A. Annular member 306B serves to maintain filter 204 within cap member 306 in a fixed position. Like cap member 206, cap member 306 is constructed of metal or like compositions and provides structural support to filter 204.

In example embodiments, cap member 306 is engaged with and secured to volume reduction member 308. In this way, filter 204, cap member 306 and volume reduction member 308 form a single, unitary and integrated component, as shown in FIG. 8. Having a single, unitary component formed from filter 204, cap member 306 and volume reduction member 308 advantageously allows for a simpler and less complex process for assembling injector 12 during manufacture thereof.

In the example embodiments, cap member 306 fits over and engages with or otherwise attaches to at least a part of first portion 308A of volume reduction member 308, as shown in FIGS. 6 and 8. In one example embodiment, cap member 306 forms a press fit engagement with first portion 308A. In another example embodiment, cap member 306 is welded to first portion 308A, such as a fillet weld between bottom surface 306C of cap member 306 and the radially outer surface of first portion 308A. In each such embodiment, the angled surface 308D provides sufficient spacing for securing cap member 306 to first portion 308A. It is understood that cap member 306 may be secured to first portion 308A of volume reduction member 308 via other mechanisms.

With cap member 306 fitting over first portion 308A of volume reduction member 308, the outer diameter of sidewall 306A is the same or nearly the same as the outer diameter of second portion 308A. See FIGS. 6 and 8.

Figure 9:
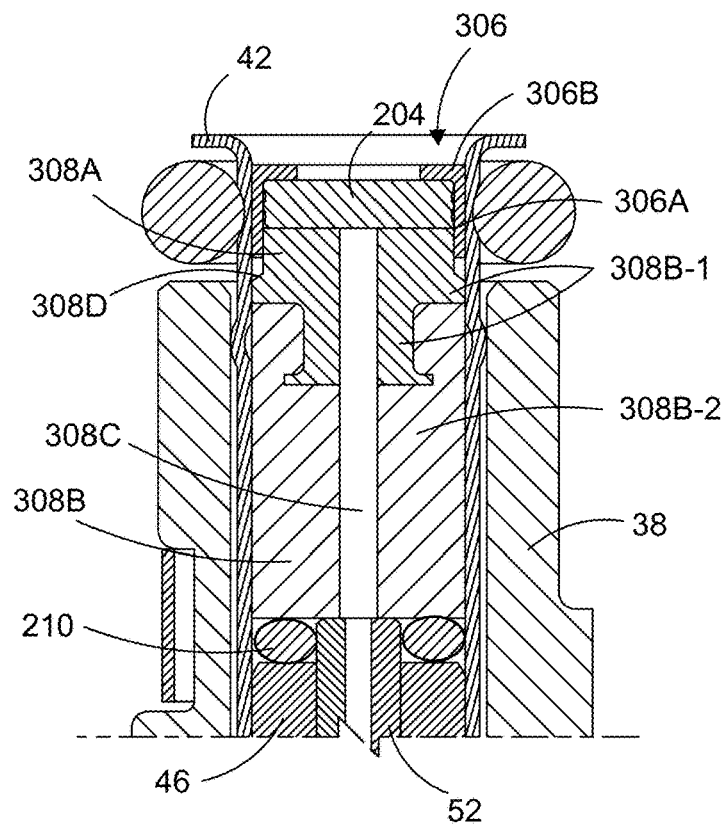
FIG. 9 is a magnified cross-sectional view of the inlet portion of the fluid injector of the RDU of FIG. 1 according to yet another example embodiment.
Figure 11:
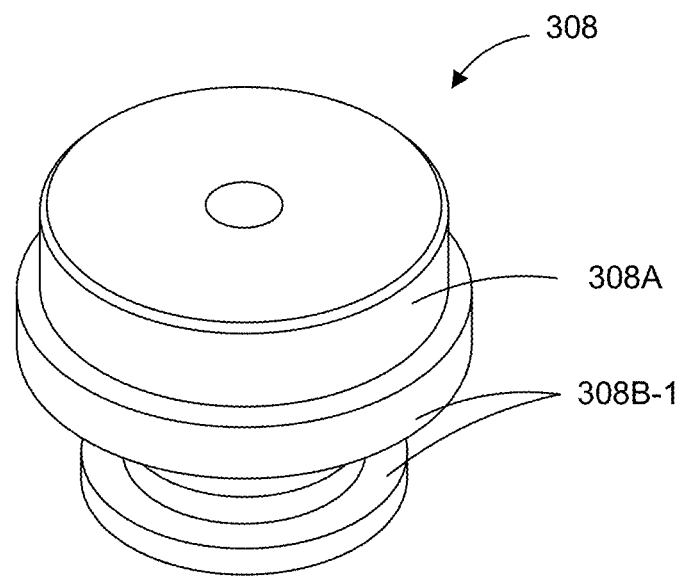
FIG. 11 is a perspective view of a component of the fluid injector of FIG. 9.
Figure 10:
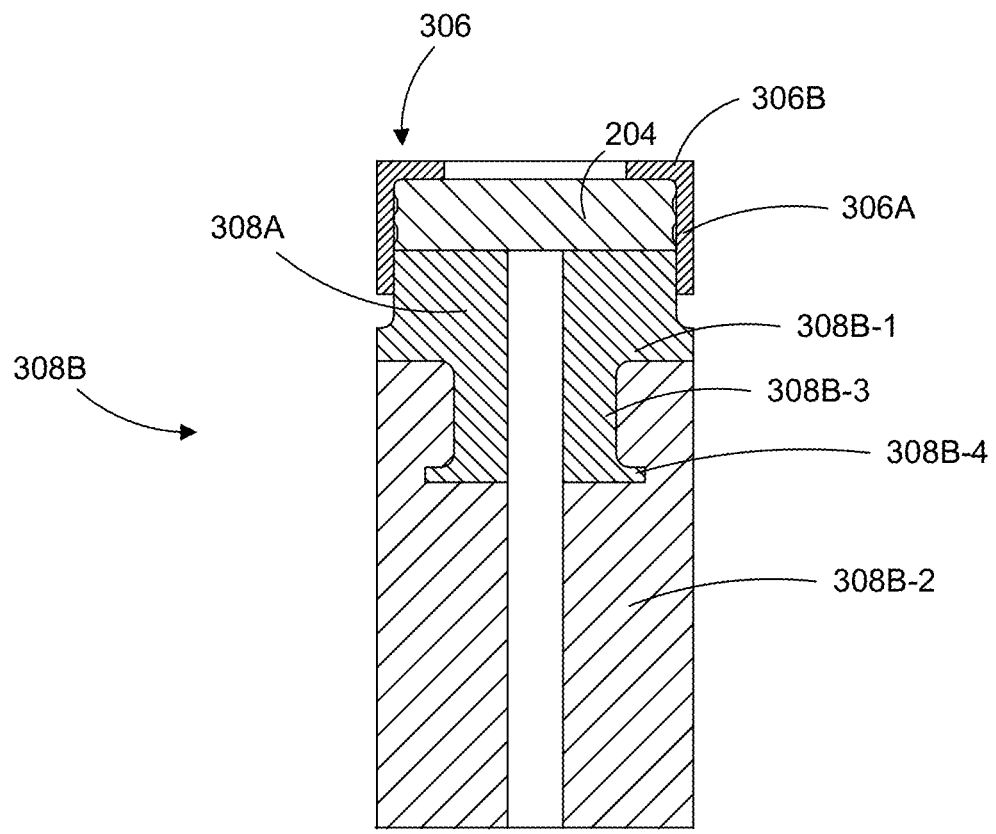
FIG. 10 is a cross-sectional view of components of the fluid injector of FIG. 9.

As discussed above, volume reduction member 308 is constructed from metal, such as stainless steel, according to an example embodiment. In another example embodiment, a part of second portion 308B is constructed from plastic or like compositions. Specifically, as illustrated in FIGS. 9-11, first portion 308A and a first part 308B-1 of second portion 308B are formed as a single metal member, and a second part 308B-2 of second portion 308B is plastic overmolded around the first part thereof. FIG. 11 shows the metal first portion 308A and first part 308B-1 of second portion 308B. First part 308B-1 of second portion 308B includes intermediate section 308B-3 which extends away from first portion 308A in an axial (downstream) direction, and distal section 308B-4 which is attached to intermediate section 308B-3 and extends in the axial (downstream) direction therefrom, as shown in FIG. 10. Distal section 308B-4 extends in a radial direction further from a longitudinal axis of volume reduction member 308 (and/or injector 12) than the radial extension of intermediate section 308B-3 so as to form a ledge. Second part 308B-2 of second portion 308B, made of overmolded plastic or other like compositions, is formed around the ledge formed by intermediate section 308B-3 and distal section 308B-4 so as to form volume reduction member 308 as a single, unitary and integrated component. As discussed above, volume reduction member 308 is connected to cap member 306 so as to result in volume reduction member 308, filter 204 and cap member 306 forming a single assembly component for use in assembling injector 12.

During assembly of injector 12, the single assembly component (filter 204, cap member 306 and volume reduction member 308) is inserted within tube member 42 under pressure while contacting volume compensator 212. Following insertion and while still under pressure, cap member 306 is welded to tube member 42 all along the intersection thereof along the top portion of tube member 42. In an embodiment, the weld connection is a fillet weld.

Figure 12:
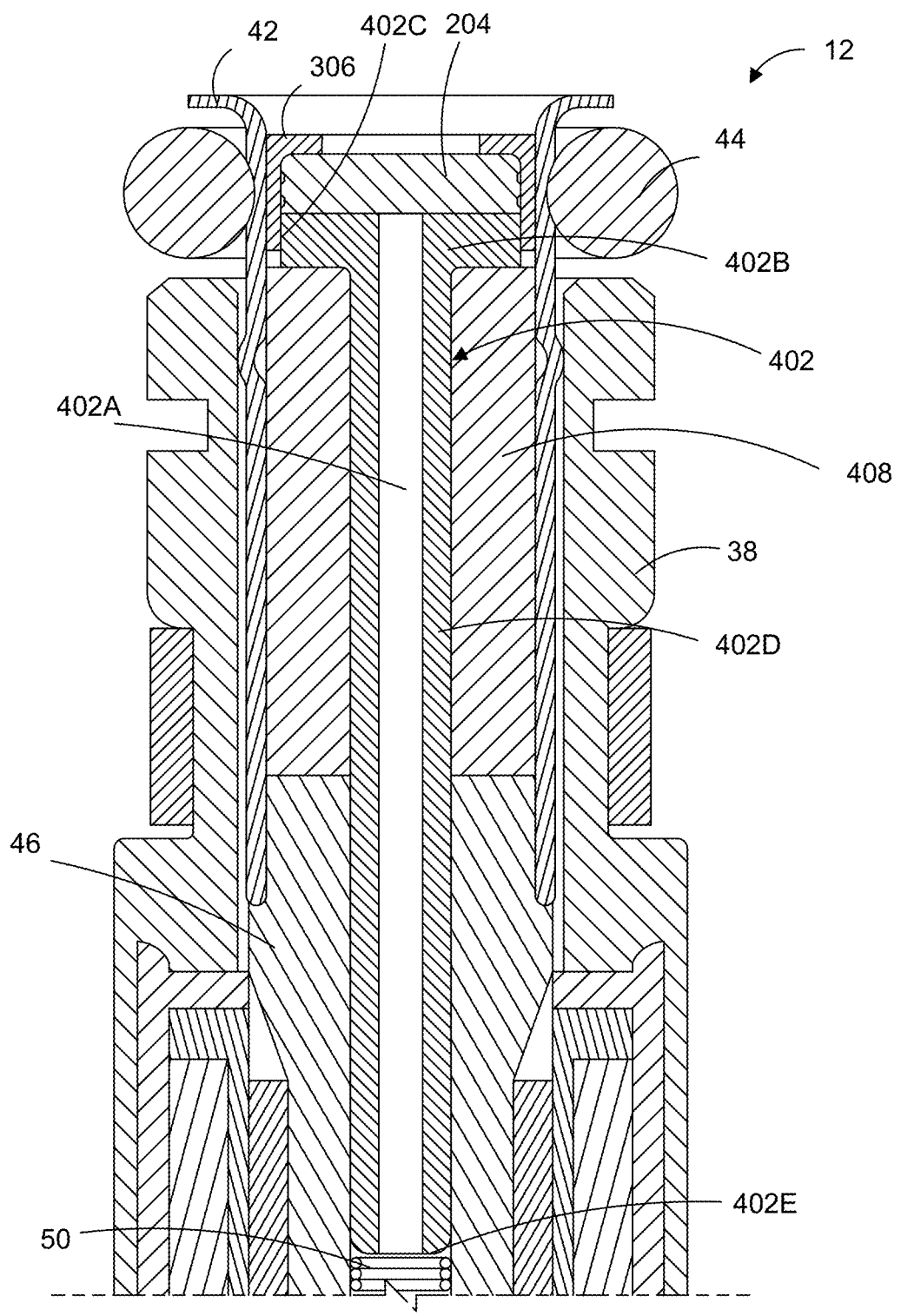
FIG. 12 is a cross-sectional view of the inlet portion of the fluid injector of the RDU of FIG. 1 according to another example embodiment.

FIG. 12 illustrates fluid injector 12 according to another example embodiment. In this embodiment, fluid injector 12 includes filter 204 and cap member 306 in which filter 204 is disposed, as described above. In addition, fluid injector 12 includes calibration filter tube 402 and volume reduction member 408. Calibration filter tube 402 includes a bore 402A which is axially defined through calibration filter tube 402. At one (upstream) end of calibration filter tube 402, bore 402A is in fluid communication with filter 204 for receiving reductant therefrom. At the other (downstream) end of calibration filter tube 402, bore 402A provides reductant to armature 16. In this way, calibration filter tube 402 forms part of the fluid path for reductant through fluid injector 12, and forms the only such fluid path from filter 204 to armature 16. With the diameter of bore 402A of calibration filter tube 402 being small relative to the inner diameter of tube member 42, the volume of the fluid path for reductant through injector 12 is reduced so as to lessen the adverse impact of reductant freezing therein.

Figure 13:
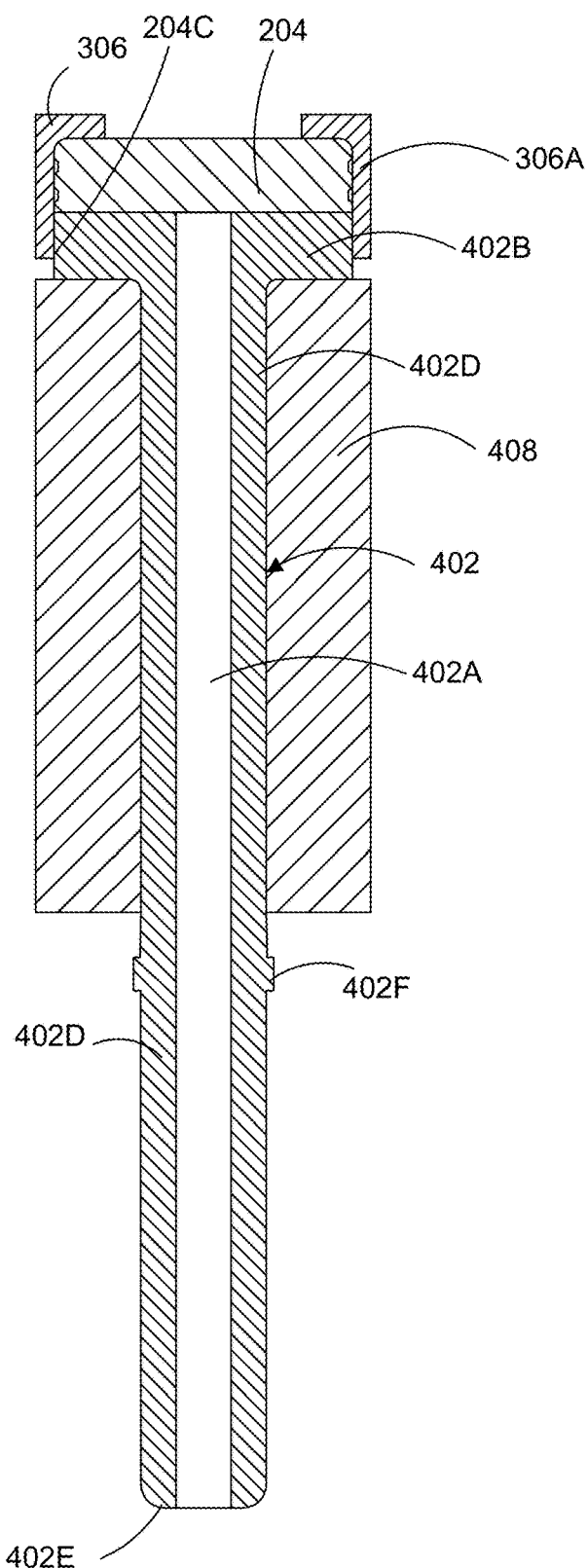
FIG. 13 is a cross-sectional view of integrated components of the fluid injector of FIG. 12.
Figure 14:
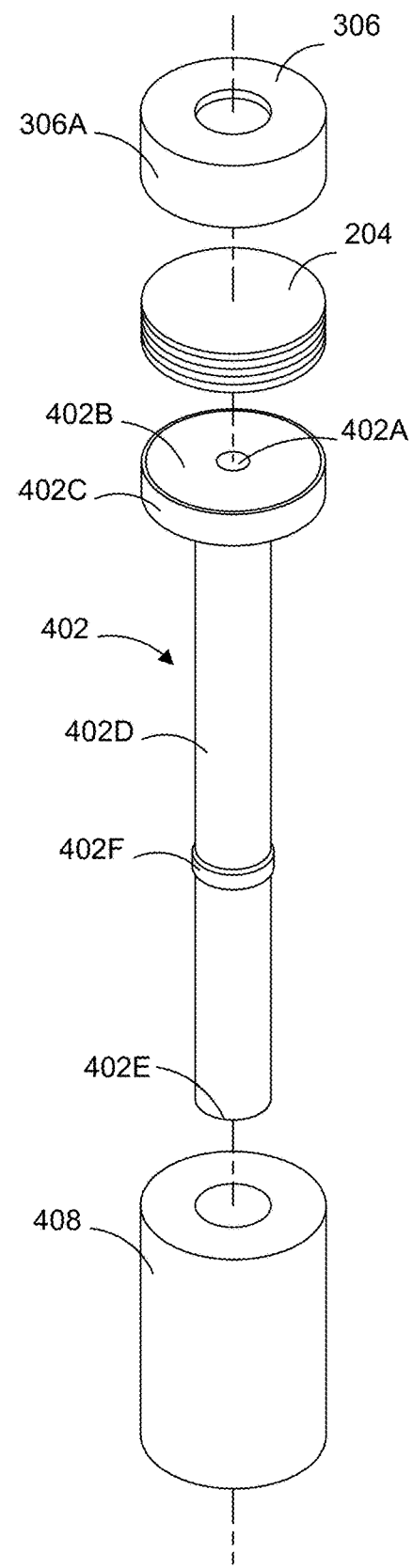
FIG. 14 is an exploded perspective view of the components of the fluid injector of FIG. 13.

As shown in FIGS. 12-14, calibration filter tube 402 further includes first end portion 402B which is disposed at least partly within cap member 306 and contacts filter 204. First end portion 402B is largely disc-shaped, having a sidewall 402C which contacts the inner surface of sidewall 306A of cap member 306. In an example embodiment, first end portion 402B of calibration fluid member 402 is attached to cap member 306 so that cap member 306, filter 204 and calibration filter tube 402 form a single, unitary and integrated subassembly component for facilitating simplified assembly of fluid injector 12. In one example embodiment, cap member 306 engages with first end portion 402B, and particularly forms a press fit engagement therewith. In another example embodiment, cap member 306 is welded to first end portion 402B, such as a fillet weld connection between the axial end of sidewall 306A of cap member 306 and the outer surface of sidewall 402C of first portion 402A. It is understood that, alternatively or additionally, cap member 306 may be secured to first end portion 402B of calibration filter tube 402 using other techniques.

Calibration filter tube 402 further includes elongated second portion 402D which extends in an axial direction from first end portion 402A, as shown in FIGS. 12-14. Second portion 402D is sized to extend into pole piece 46 so that a second end 402E, opposite first end portion 402B, engages with spring 50 (FIG. 12). Second portion 402D is largely cylindrically shaped, with bore 402A disposed therein. Calibration filter tube 402 further includes annular tab 402F which extends radially outwardly from the outer surface of second portion 402D. Tab 402F extends slightly outwardly from the outer surface of, and is positioned along, second portion 402D of calibration filter tube 402 so as to contact the inner surface of pole piece 46 defining the central bore thereof. This contact between tab 402F and the central bore of pole piece 46 results in calibration filter tube 402 forming a press fit attachment with pole piece 46.

As mentioned, second end 402E of calibration filter tube 402 contacts and engages with spring 50. Due to the engagement between calibration filter tube 402 and spring 50, and the engagement between armature 16 and spring 50, calibration filter tube 402 is used to calibrate the dynamic flow of reductant through fluid injector 12. Specifically, with cap member 306, filter 204 and calibration filter tube 402 being formed as a single, unitary and integrated subassembly component, positioning calibration filter tube 402 in the desired position within tube member 42, prior to welding cap member 306 thereto, is simplified for providing the desired calibrated force for spring 50.

Calibration filter tube 402 is formed from a metal composition, such as stainless steel.

With continued reference to FIGS. 12-14, injector 12 further includes volume reduction member 408 which is disposed around second portion 402D of calibration filter tube 402. Volume reduction member 408 has a cylindrical shape, with a central bore defined axially through volume reduction member 408. The central bore of volume reduction member 408 is sized for receiving calibration filter tube 402 therein. As shown in FIG. 12, the outer radial surface of volume reduction member 408 contacts the inner surface of tube member 42. One axial (upstream) end of volume reduction member 408 is disposed adjacent and contacts first end portion 402B of calibration filter tube 42, and the other axial (downstream) end of volume reduction member 408 is disposed against and contacts the upstream end of pole piece 46. In this way, volume reduction member 408 occupies the space between second portion 402D of calibration filter tube 402 and tube member 42 that is upstream of pole piece 46 and downstream of first end portion 402B of calibration filter tube 402. In an example embodiment, volume reduction member 408 is attached to calibration filter tube 402 such that volume reduction member 408 forms the single, unitary and integrated subassembly component with cap member 306, filter 204 and calibration filter tube 402.

In an example embodiment, volume reduction member 408 is constructed from a resilient and compressible material, and is compressible in at least the axial direction along fluid injector 12. Volume reduction member 408 being compressible in the axial direction allows for the single assembly component (cap member 306, filter 204 and calibration filter tube 402) to be adjustably positioned within tube member 42 relative to pole piece 46 so that the opening and closing force of the valve assembly of fluid injector 12 may be easily calibrated as desired. In one embodiment, volume reduction member 408 is constructed from closed cell foam. It is understood, though, that volume reduction member 408 may be constructed from other compressible material. If constructed from closed cell foam, volume reduction member 408 is compressible in both axial (longitudinal) and radial (lateral) directions. In an example embodiment, volume reduction member 408 is in a compressed state in fluid injector 12.

Figure 15:
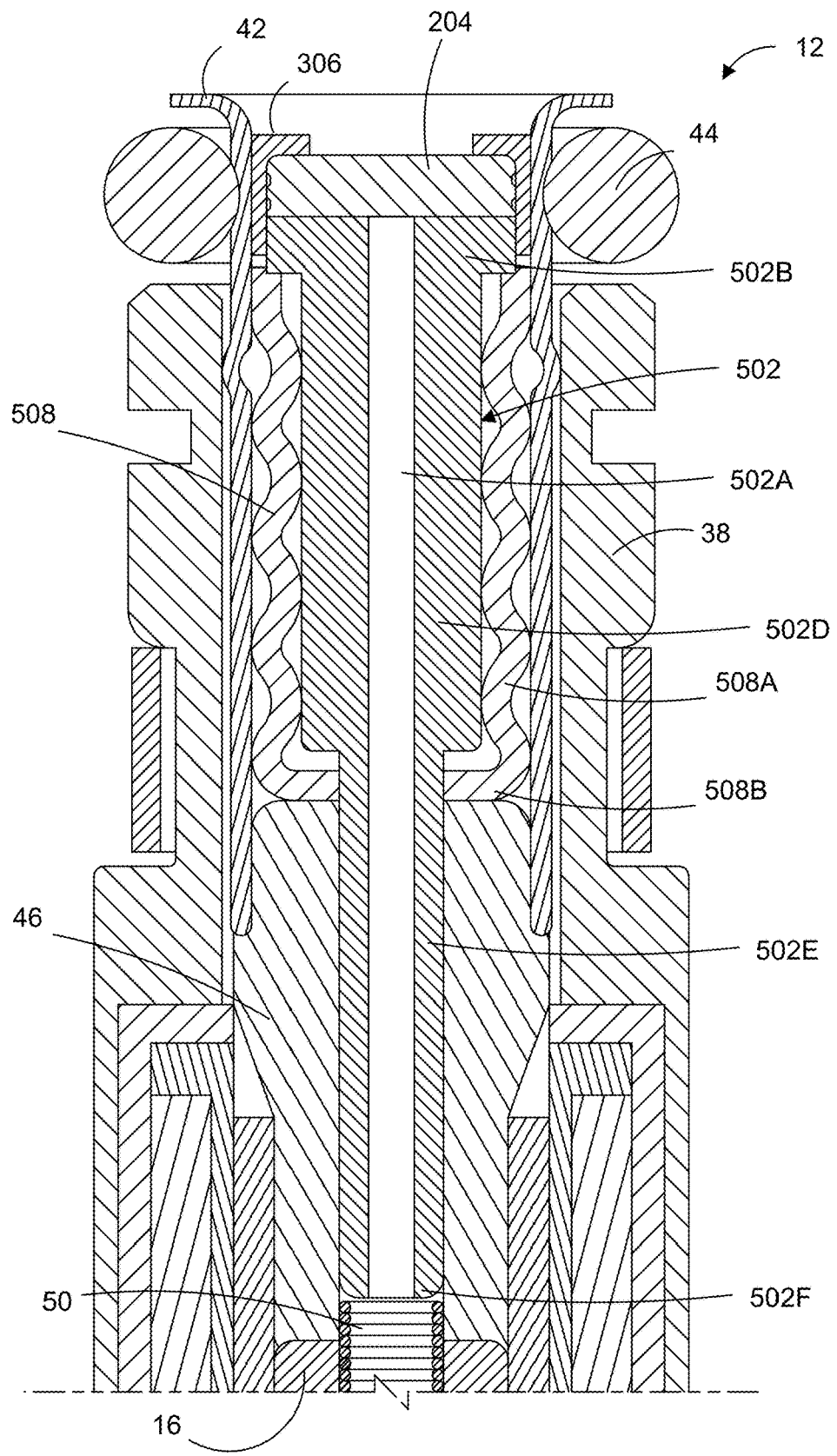
FIG. 15 is a cross-sectional view of the inlet portion of the fluid injector of the RDU of FIG. 1 according to another example embodiment.

FIGS. 15-17 illustrate fluid injector 12 according to another example embodiment. In this embodiment, fluid injector 12 includes filter 204 and cap member 306 in which filter 204 is disposed, as described above. In addition, fluid injector 12 includes calibration filter tube 502. Calibration filter tube 502 has many features of calibration filter tube 402 described above with respect to FIGS. 12-14.

Calibration filter tube 502 includes a bore 502A which is axially defined through calibration filter tube 502. At one (upstream) end of calibration filter tube 502, bore 502A is in fluid communication with filter 204 for receiving reductant therefrom. At the other (downstream) end of calibration filter tube 502, bore 502A provides reductant to armature 16. In this way, calibration filter tube 502 forms part of the fluid path for reductant through fluid injector 12, and forms the only such fluid path from filter 204 to armature 16. With the diameter of bore 502A of calibration filter tube 502 being small relative to the inner diameter of tube member 42, the volume of the fluid path for reductant through injector 12 is reduced so as to lessen the adverse impact of reductant freezing therein.

As shown in FIGS. 15-17, calibration filter tube 502 further includes first end portion 502B which is disposed at least partly within cap member 306 and contacts filter 204. First end portion 502B is largely disc-shaped, having a sidewall 502C which contacts the inner surface of sidewall 306A of cap member 306. In an example embodiment, first end portion 502B of calibration fluid member 502 is attached to cap member 306 so that cap member 306, filter 204 and calibration filter tube 502 form a single, unitary and integrated subassembly component for facilitating simplified assembly of fluid injector 12. In one example embodiment, cap member 306 engages with first end portion 502B, and particularly forms a press fit engagement therewith. In another example embodiment, cap member 306 is welded to first end portion 502B, such as a fillet weld connection between the axial end of sidewall 306A of cap member 306 and the outer surface of sidewall 502C of first portion 502B. It is understood that, additionally or alternatively, cap member 306 may be secured to first end portion 502B of calibration filter tube 502 using other techniques.

Calibration filter tube 502 further includes an elongated second portion 502D which extends in an axial direction from first portion 502A, and an elongated third portion 502E which extends in the axial direction from second portion 502D, as shown in FIGS. 15-17. Third portion 502E is sized to extend into pole piece 46 so that a second end 502F of calibration filter tube 502, opposite first end portion 502B, engages with spring 50 (FIG. 12). Second portion 502D and third portion 502E are largely cylindrically shaped, with bore 502A disposed therein.

In an example embodiment, the outer diameter of second portion 502D is larger than the outer diameter of third portion 502E. The outer diameter of third portion 502E is sized for being received in the central bore of pole piece 46.

Calibration filter tube 502 further includes annular tab 502G (FIG. 17) which extends radially outwardly from the outer surface of third portion 502E. Tab 502G extends slightly outwardly from the outer surface of, and is axially positioned along, third portion 502E of calibration filter tube 502 so as to contact the inner surface of pole piece 46 defining the central bore thereof. This contact between tab 502G and the central bore of pole piece 46 results in calibration filter tube 502 forming a press fit engagement with pole piece 46.

Calibration filter tube 502 is formed from a metal composition, such as stainless steel.

As mentioned, second end 502F of calibration filter tube 502 contacts and engages with spring 50. Due to the engagement between calibration filter tube 502 and spring 50, and the engagement between spring 50 and armature 16, calibration filter tube 502 is used to calibrate the dynamic flow of reductant through fluid injector 12. Specifically, with cap member 306, filter 204 and calibration filter tube 502 being formed as a single, unitary and integrated subassembly component, positioning of calibration filter tube 502 in the desired position within tube member 42, prior to welding cap member 306 thereto, is simplified for providing the desired calibrated force for spring 50 for setting the opposed opening and closing force for the valve assembly of fluid injector 12.

With continued reference to FIGS. 15-17, injector 12 further includes volume reduction member 508 which is disposed around second portion 502D of calibration filter tube 502. Volume reduction member 508 has a generally cylindrical shape, with a central bore defined axially through volume reduction member 508. The central bore of volume reduction member 508 is sized for receiving second portion 502D of calibration filter tube 502 therein. As shown in FIG. 12, the outer radial surface of volume reduction member 508 contacts the inner surface of tube member 42. One axial (upstream) end of volume reduction member 508 is disposed adjacent and contacts first end portion 502B of calibration filter tube 42, and the other axial (downstream) end of volume reduction member 508 is disposed against and contacts the upstream end of pole piece 46. In this way, volume reduction member 508 occupies the space between second portion 502D of calibration filter tube 502 and tube member 42 that is upstream of pole piece 46 and downstream of first end portion 502B of calibration filter tube 502.

In an example embodiment, volume reduction member 508 is constructed from compressible material, such as being compressible in at least the axial direction along fluid injector 12. Volume reduction member 508 being compressible in at least the axial direction allows for the single assembly component (cap member 306, filter 204 and calibration filter tube 502) to be adjustably positioned within tube member 42 relative to pole piece 46 so that the valve assembly of fluid injector 12 may be calibrated as desired. In an example embodiment, volume reduction member 508 is in a compressed state in fluid injector 12.

As shown in FIGS. 15-17, volume reduction member 508 includes a sidewall 508A which extends between two axial ends. A downstream axial end wall 508B of volume reduction member 508 extends radially inwardly from sidewall 508A and contacts the outer surface of third portion 502E of calibration filter tube 502. The upstream axial end of volume reduction member 508 may be open and contact a downstream surface of first portion 502B of calibration filter tube 502.

Sidewall 508A of volume reduction member 508 undulates in an axial direction, as shown in FIGS. 15-17, alternating between sidewall peaks and valleys in a wave-like pattern relative to a longitudinal axis of volume reduction member 508 and/or injector 12. Having an undulating sidewall 508A facilitates sidewall 508A being compressible or otherwise partly collapsible in both axial (longitudinal) and radial (lateral) directions. In an example embodiment, volume reduction member 508 is constructed from a compressible, resilient material, such as a rubber composition or other like material. Volume reduction member 508 may be in a compressed state within fluid injector 12.

Figure 18:
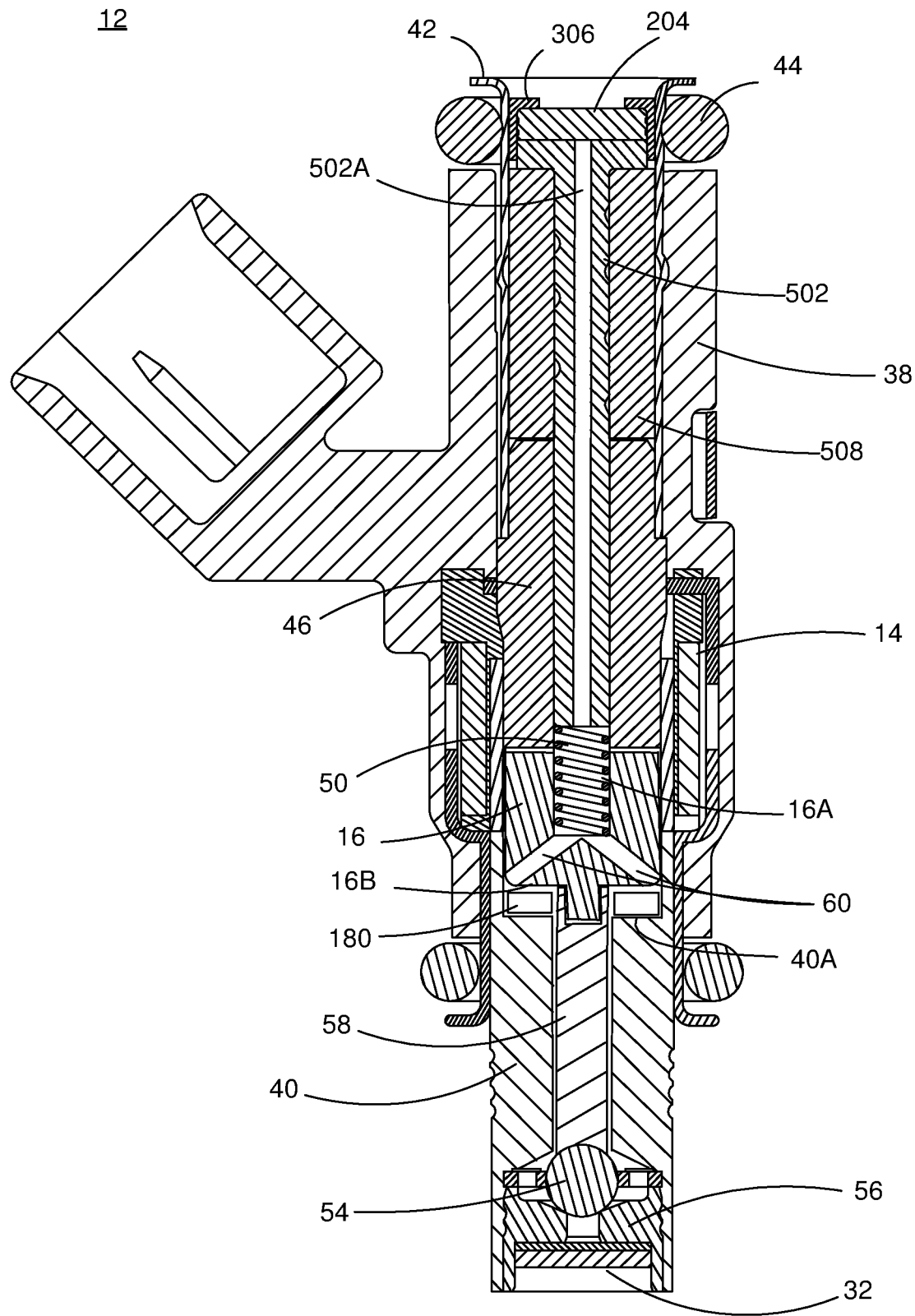
FIG. 18 is a cross-sectional view of a fluid injector of the RDU of FIG. 1, according to another example embodiment.
Figure 19:
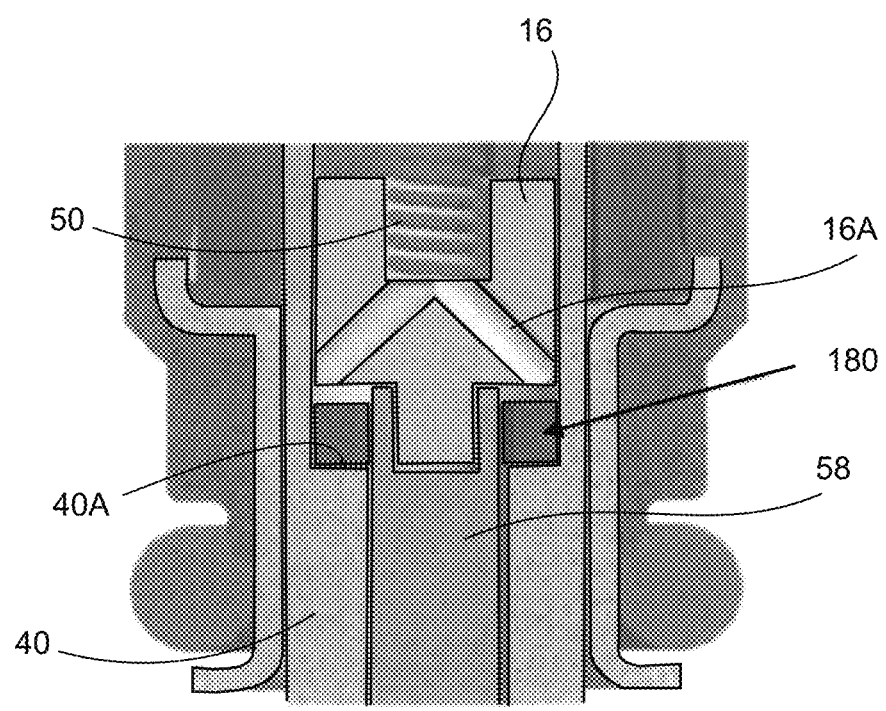
FIG. 19 is a cross-sectional view of a portion of the fluid injector of FIG. 18 according to an example embodiment.

FIG. 18 depicts fluid injector 12 according to another example embodiment. In this embodiment, fluid injector 12 includes many of the components of example embodiments described above, including but not limited to armature 16, pole piece 40, pin member 58 and spring 50, and such components have the same corresponding reference numbers. In addition, fluid injector 12 includes a spacer member 180 disposed in proximity to the valve assembly of fluid injector 12. In the example embodiment, spacer member 180 has a ring and/or annular shape with a polygonal shaped cross-section, such as a square or rectangular shaped cross-section, but it is understood that spacer member 180 may have other shapes and/or be formed from a number of elements which combine to form the ring and/or annular shape. As shown in FIGS. 18 and 19, valve body member 40 includes a shoulder or ledge 40A which extends radially in a direction that is orthogonal to a longitudinal axis of fluid injector 12. Shoulder 40A provides a transition between distinct radial dimensions of open spaces within fluid injector 12, with one such open space having pin member 58 disposed therein and a second open space having armature 16 and pole piece 40 disposed therein. Spacer member 180 is disposed on and above shoulder 40A, radially between an inner surface of valve body portion 40 and an outer surface of an upstream end of pin member 180. Further, spacer member 180 is disposed between shoulder 40A and a downstream (i.e., lower, as viewed in FIGS. 18 and 19) end portion 16B of armature 16. Spacer member 180 occupies a volume in an open space in a fluid flow path in fluid injector 12 through which fluid, such as a reductant, would otherwise occupy. By occupying a space in fluid injector 12 which would otherwise be occupied by reductant, a reduced amount of reductant may be disposed in fluid injector 12, thereby lessening an amount of reductant which may freeze and damage components of fluid injector 12.

In an example embodiment, spacer member 180 is constructed from a compressible, resilient material, such as a rubber composition and closed cell foam. In this way, expansion forces from freezing and/or frozen reductant located in or around armature 16 cause spacer member 180 to be compressed, thereby allowing the expanding/expanded reductant to occupy the space occupied by spacer member 180 absent its compression. This provides available space for the reductant to expand when freezing so that reductant expansion forces are not directed to other components of fluid injector 12. When the frozen reductant melts, spacer member 180 resiliently expands and returns to its largely uncompressed state.

Figure 20:
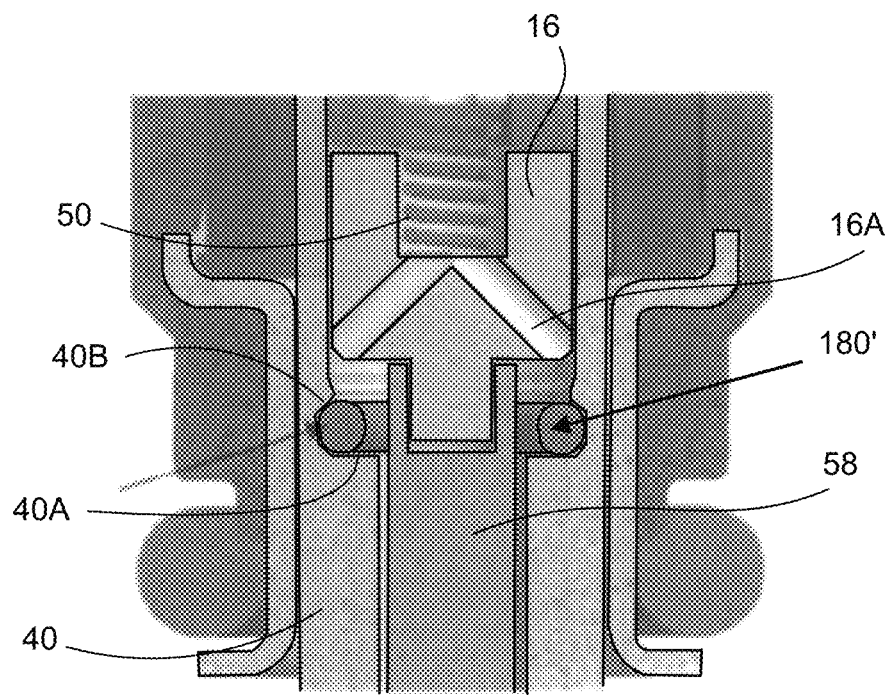
FIGS. 20 and 21 are cross-sectional views of a portion of the fluid injector of FIG. 18 according to another example embodiment.
Figure 21:
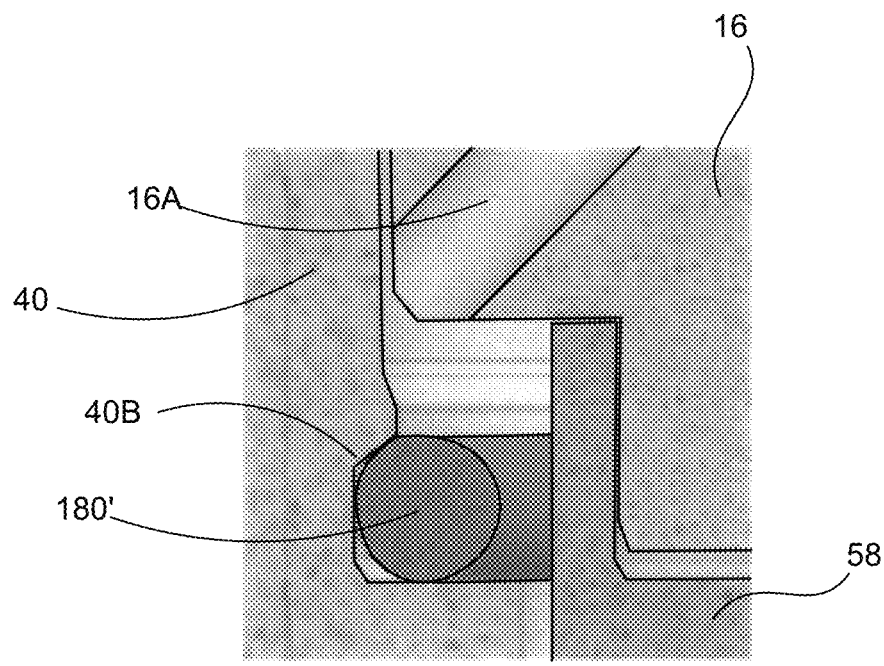

FIGS. 20 and 21 illustrate a spacer member 180' having the same resilient, compressible characteristics as described above with respect to spacer member 180. In addition, spacer member 180' has a circular cross-sectional shape. It is understood that, alternatively, spacer member 180' may have an oblong or oval shaped cross-section.

FIGS. 20 and 21 illustrate that an inner wall 40B of valve body portion 40 may be shaped and/or otherwise have a contour for receiving spacer member 180' therein.

Use of spacer members 180, 180' results in a compression seal to reduce fluid volume in fluid injector 12, compressing as reductant freezes and expanding as frozen reductant melts, preventing component displacement of other components of injector 12 from freezing forces from the reductant. This is achieved with spacer member 180, 180' being compressible which can expand and contract at varying temperatures to ensure the space in fluid injector 12 for holding reductant is reduced or minimized. Spacer member 180, 180' reduces the volume of the reductant fluid path in injector 12 while being compressible so as to absorb reductant freezing forces, thereby resulting in a more robust fluid injector 12. The compressible material of spacer member 180, 180' is such that the material will expand and contract at various temperatures so as to ensure that the available space for reductant in fluid injector 12 is reduced. Spacer member 180, 180' absorbs freezing forces and compresses as a result, thereby reducing freezing forces directed to other components and interfaces within fluid injector 12.

Figure 22:
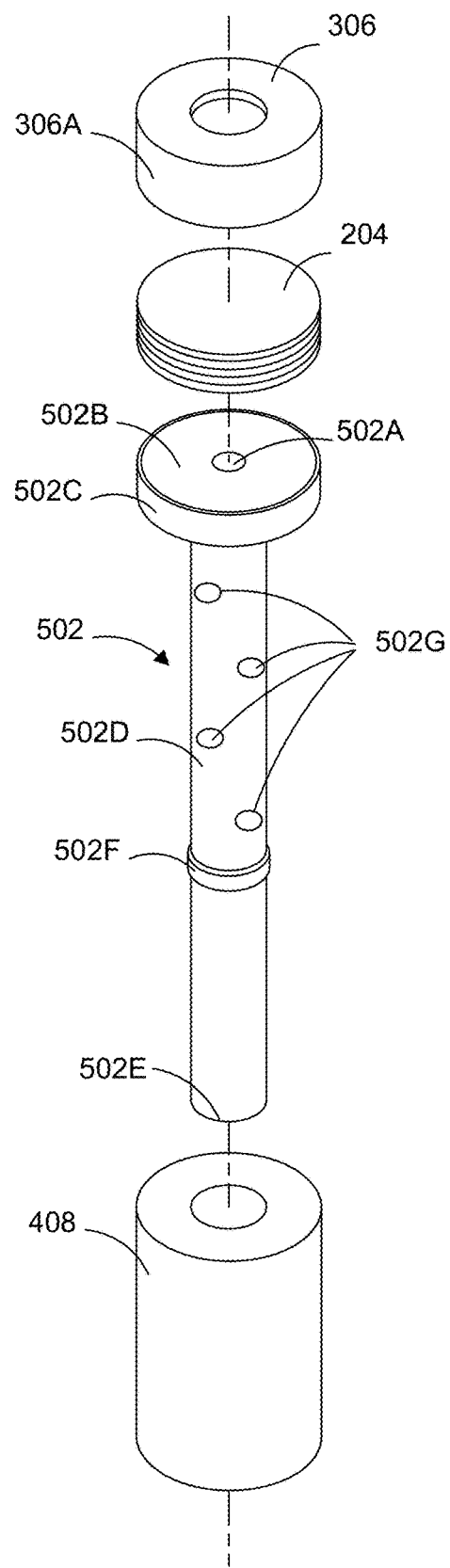
FIG. 22 is an exploded perspective view of a portion of the fluid injector of FIG. 18 according to another example embodiment.

FIG. 22 illustrates an aspect of fluid injector 12 of FIG. 18 in accordance with another example embodiment. Specifically, fluid injector 12 includes filter 204 and cap member 306 in which filter 204 is disposed, as described above. Fluid injector 12 of FIG. 18 further includes a calibration filter tube 502. Calibration filter tube 502 includes many or all of the features of calibration filter tube 402 described above with respect to FIGS. 12-14. For example, calibration filter tube 502 includes a disc-shaped first end portion 502B, similar to first end portion 402B, and a second end 502E. First end portion 502B includes a sidewall 502C, similar to sidewall 402C. Elongated second portion 502D extends between first end portion 502B and second end 502E through which bore 502A extends. Annular tab 502F is disposed in a central region of elongated second portion 502D. Further, unlike calibration filter 402, calibration filter tube 502 includes a plurality of holes 502G which are disposed at least along an upstream (top, relative to FIG. 22) portion of elongated second portion 502D which is adjacent volume reduction member 408. Each hole 502G extends between central, axial bore 502A and an outer surface of elongated second portion 502D. In this way, fluid/reductant is able to pass between bore 502A and a space along an outer surface of elongated second portion 502D.

Fluid injector 12 of FIG. 18 further includes volume reduction member 408 as described above with respect to FIGS. 12-14. Volume reduction member 408 is constructed from a resilient and compressible material, and is resiliently compressible in axial and radial directions along fluid injector 12. Volume reduction member 408 being compressible in the axial direction allows for the single assembly component (cap member 306, filter 204 and calibration filter tube 502) to be adjustably positioned within tube member 42 relative to pole piece 46 so that the opening and closing force of the valve assembly of fluid injector 12 may be easily calibrated as desired. In one embodiment, volume reduction member 408 is constructed from closed cell foam. It is understood, though, that volume reduction member 408 may be constructed from other resilient, compressible material. In an example embodiment, volume reduction member 408 is in a partly compressed state in fluid injector 12.

Freezing reductant that is disposed within bore 502A of calibration filter tube 502 is allowed to expand through holes 502G so that calibration filter tube 502 is less likely to being damaged from expanding reductant disposed therein. With holes 502G being adjacent volume reduction member 408, freezing reductant expanding through holes 502G contact and compress volume reduction member 408 so as to allow for expanding (freezing) reductant to easily exit calibration filter tube 502, thereby reducing or eliminating freezing forces acting thereon.

The reductant flow path through fluid injector 12 may include a fluid path from bore 502A, through holes 502G and into pocket 16A before passing through channels 60 and along the outer surface of pin member 58 before exiting fluid outlet 32. In this case, holes 502G of calibration filter tube 502 form part of the fluid (reductant) path through fluid injector 12.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A reductant delivery unit, comprising:
a fluid injector having a fluid inlet disposed at a first end of the fluid injector for receiving a reductant, and a fluid outlet disposed at a second end of the fluid injector for discharging the reductant, the fluid injector defining a fluid path for the reductant from the fluid inlet to the fluid outlet, the fluid injector comprising:
a tube member having an end disposed at the fluid inlet of the fluid injector, the tube member configured to pass reductant along the fluid path;
a calibration filter tube disposed in the tube, the calibration filter tube having a first end portion and a second end, and further including a bore defined in an axial direction through the calibration filter tube, the bore defining at least a portion of the fluid path through the fluid injector;
an actuator unit disposed within the fluid injector downstream of the calibration filter tube, the actuator unit engaging the second end of the calibration filter tube;
a valve assembly operatively coupled to the actuator unit, wherein a position of the calibration filter tube within the tube member at least partly sets an opposing opening force for the valve assembly; and
a volume reduction member having a bore though which the calibration filter tube extends, the volume reduction member occupying a space between an outer surface of the calibration filter tube and an inner surface of the tube member,
wherein the outer surface of the calibration filter tube is an outer radial surface of the calibration filter tube which extends between axial end surfaces of the calibration filter tube,
wherein the calibration filter tube includes one or more apertures extending between the bore of the calibration filter tube in a radial direction between the bore of the calibration filter tube and the outer surface thereof.

2. The reductant delivery unit of claim 1, wherein the volume reduction member is formed from a resilient, compressible material.

3. The reductant delivery unit of claim 2, wherein the resilient, compressible material comprises one of a rubber composition and closed cell foam.

4. The reductant delivery unit of claim 1, wherein the fluid injector further comprises a filter and a cap member including a sidewall defining an inner space into which the filter is disposed, the sidewall contacting the first end of the calibration filter tube.

5. The reductant delivery unit of claim 1, wherein the one or more apertures of the calibration filter tube is adjacent the volume reduction member such that freezing or frozen reductant disposed in the calibration filter tube expands through the holes and at least partially compresses the volume reduction member.

6. The reductant delivery unit of claim 5, wherein melting reductant allows for the volume reduction member to expand so as to be adjacent the holes of the calibration filter tube.

7. A fluid injector, comprising:
a fluid inlet disposed at a first end and configured to receive a fluid, and a fluid outlet disposed at a second end of the fluid injector for discharging the fluid, the fluid injector defining a fluid path for the fluid from the fluid inlet to the fluid outlet;
a tube member having an end disposed at the fluid inlet of the fluid injector, the tube member configured to pass fluid along the fluid path;
a filter disposed in the tube member proximal to the fluid inlet of the fluid injector;
a calibration filter tube disposed in the tube member, the calibration filter tube having a first end portion and a second end, and further including a bore defined in an axial direction through the calibration filter tube, the bore defining at least a portion of the fluid path through the fluid injector, the calibration filter tube including a plurality of holes which extend from the bore to an outer surface of the calibration filter tube;
wherein the outer surface of the calibration filter tube is an outer radial surface of the calibration filter tube which extends between axial end surfaces of the calibration filter tube,
wherein the plurality of holes extend in a radial direction between the bore of the calibration filter tube and the outer surface thereof,
a volume reduction member having a bore though which the calibration filter tube extends, the volume reduction member occupying a space between the outer surface of
the calibration filter tube and an inner surface of the tube member, the volume reduction member being constructed from resilient, compressible material;
an actuator unit disposed within the fluid injector downstream of the calibration filter tube, the actuator unit engaging the second end of the calibration filter tube; and a valve assembly operatively coupled to the actuator unit, wherein a position of the calibration filter tube within the tube member sets an opposing opening force of the valve assembly.

8. The fluid injector of claim 7, wherein volume reduction member is constructed from one of a rubber composition and a closed cell foam.

9. The fluid injector of claim 7, wherein the fluid injector comprises an RDU injector.

10. The fluid injector of claim 7, wherein freezing or frozen fluid disposed in the calibration filter tube expands through the holes and at least partially compresses the volume reduction member.

* * * * *